United States Patent
Zhang et al.

(10) Patent No.: US 12,202,748 B2
(45) Date of Patent: Jan. 21, 2025

(54) DESALINATION SYSTEMS OF PHOTOVOLTAIC DIRECT-DRIVEN MEMBRANE CAPACITIVE DEIONIZATION

(71) Applicants: CHANGZHOU UNIVERSITY, Jiangsu (CN); JIANGSU MAYMUSE ENVIRONMENTAL TECHNOLOGY CO. LTD, Jiangsu (CN)

(72) Inventors: Yi Zhang, Changzhou (CN); Yihan Zhang, Changzhou (CN); Min Shen, Changzhou (CN); Jianfeng Jiang, Changzhou (CN); Shi Bu, Changzhou (CN)

(73) Assignees: CHANGZHOU UNIVERSITY, Changzhou (CN); JIANGSU MAYMUSE ENVIRONMENTAL TECHNOLOGY CO. LTD, Changzhou (CN)

( * ) Notice: Subject to any disclaimer, the term of this patent is extended or adjusted under 35 U.S.C. 154(b) by 417 days.

(21) Appl. No.: 17/816,433

(22) Filed: Aug. 1, 2022

(65) Prior Publication Data
US 2023/0065482 A1     Mar. 2, 2023

Related U.S. Application Data

(63) Continuation of application No. PCT/CN2022/100971, filed on Jun. 24, 2022.

(30) Foreign Application Priority Data

Aug. 30, 2021   (CN) .......................... 202111001393.4

(51) Int. Cl.
*C02F 1/469*     (2023.01)
*C02F 103/08*    (2006.01)

(52) U.S. Cl.
CPC ........ *C02F 1/4691* (2013.01); *C02F 2103/08* (2013.01); *C02F 2201/009* (2013.01);
(Continued)

(58) Field of Classification Search
None
See application file for complete search history.

(56) References Cited

U.S. PATENT DOCUMENTS

2011/0056843 A1*  3/2011  Curran ................. C02F 1/4691
                                                  204/263
2015/0027890 A1*  1/2015  Jha ....................... B01D 61/445
                                                  204/632

(Continued)

FOREIGN PATENT DOCUMENTS

CN     102237824 A     11/2011
CN     105948187 A     9/2016
(Continued)

OTHER PUBLICATIONS

First Office Action in Chinese Application No. 202111001393.4 mailed on Jul. 25, 2023, 19 pages.
(Continued)

*Primary Examiner* — Richard C Gurtowski
(74) *Attorney, Agent, or Firm* — METIS IP LLC

(57) ABSTRACT

The present disclosure relates to a desalination system of photovoltaic direct-driven membrane capacitive deionization. The system includes a photovoltaic direct-driven group and a municipal power grid-connected group. The photovoltaic direct-driven group includes a photovoltaic power collection unit, a power storage unit, a direct-driven power monitoring unit, a voltage adjustment unit, and a membrane capacitive deionization water purification unit. The municipal power grid-connected group includes a grid-connected control unit, a grid busbar unit, and an intelligent detection unit.

5 Claims, 13 Drawing Sheets

(52) U.S. Cl.
CPC .... *C02F 2201/46* (2013.01); *C02F 2209/006* (2013.01); *C02F 2209/02* (2013.01); *C02F 2209/05* (2013.01)

(56) References Cited

U.S. PATENT DOCUMENTS

| | | | |
|---|---|---|---|
| 2018/0339916 A1 | | 11/2018 | Alshahrani |
| 2019/0062182 A1* | | 2/2019 | Choi .......................... C02F 1/50 |

FOREIGN PATENT DOCUMENTS

| | | | |
|---|---|---|---|
| CN | 107370229 | A | 11/2017 |
| CN | 207251286 | U | 4/2018 |
| CN | 109824127 | A | 5/2019 |
| CN | 210065421 | U | 2/2020 |
| CN | 210915675 | U | 7/2020 |
| CN | 112736962 | A | 4/2021 |
| CN | 113636628 | A | 11/2021 |
| CN | 216336767 | U | 4/2022 |
| KR | 20190101546 | A | 9/2019 |

OTHER PUBLICATIONS

Decision to Grant a Patent in Chinese Application No. 202111001393.4 mailed on Jan. 16, 2024, 2 pages.
International Search Report in PCT/CN2022/100971 mailed on Aug. 31, 2022, 8 pages.
Written Opinion in PCT/CN2022/100971 mailed on Aug. 31, 2022, 11 pages.
Huang, Daishi et al., Study on Desalination Performance of Membrane Capacitive Deionization, Acta Scientiae Circumstantiae, 35(10): 3131-3136, 2015.

* cited by examiner

1100

```
1110 → Obtaining the salt content information of brackish water
           ↓
1120 → Obtaining preset process parameters based on salt content information
           ↓
1130 → Controlling the membrane capacitive deionization water purification unit to perform desalination operation based on preset process parameters
           ↓
1140 → Obtaining desalination performance
           ↓
1150 → Whether the desalination performance meets the preset conditions
           ↓ No
1160 → In response to the desalination performance not meeting the preset conditions, adjusting at least part of the preset process parameters based on the adjustment scheme
```

FIG. 11

DESALINATION SYSTEMS OF PHOTOVOLTAIC DIRECT-DRIVEN MEMBRANE CAPACITIVE DEIONIZATION

CROSS-REFERENCE TO RELATED APPLICATIONS

This application is a Continuation of International Application No. PCT/CN2022/100971, filed on Jun. 24, 2022, which claims priority of Chinese Patent Application No. 202111001393.4, filed on Aug. 30, 2021, the entire contents of which are hereby incorporated by reference.

TECHNICAL FIELD

The present disclosure relates to the technical field of photovoltaic direct-driven water purification equipment, in particular to a desalination system of photovoltaic direct-driven membrane capacitive deionization.

BACKGROUND

At present, the total outputs are greatly increased by simply increasing the grain yield per mu of existing arable land, which has encountered a bottleneck. If the large amount of saline-alkali land in the vast coastal and inland areas of our country is transformed into effective arable land suitable for grain production, it will be possible to make a qualitative leap in grain production and greatly improve the grain situation in our country. According to estimation, there are about 1.5 billion mu of saline-alkali land in my country, of which 200 million mu are currently eligible for renovation. It is estimated that if 100 million mu of them are converted into arable land, the annual yield will increase by 30 billion kg if the minimum yield of rice is 300 kg per mu, which can feed 80 million more people.

The key problem that must be solved in the restoration and transformation of saline-alkali land is the desalination of brackish water. Among various desalination treatment technologies, membrane capacitive deionization technology has the advantages of high water production rate, low power consumption, convenient operation and maintenance, and low initial investment cost. It is currently the most advanced brackish water technology.

Membrane capacitive deionization uses a constant voltage direct current power supply and uses the surface of the charged electrode to adsorb ions and charged particles in the water, so that the dissolved salts and other charged substances in the water are enriched and concentrated on the surface of the electrode to achieve water purification. Anion/cation exchange membranes are laid on the surface of the positive and negative electrodes to ensure the directional migration and adsorption process of ions, and effectively prevent the adsorbed ions from being carried away due to the disturbance of water flow. At the same time, the desorbed ions are prevented from being adsorbed on the opposite electrode twice during the regeneration process, which greatly improves the ion removal efficiency and the electrode regeneration efficiency.

The membrane capacitive deionization requires constant voltage direct current. In general use scenarios, the alternating current of the municipal grid is converted into direct current through alternating current/direct current (AC/DC) to supply equipment for use, and there is a large proportion of power consumption in the conversion process. The large area of saline-alkali land in my country has excellent light and heat conditions. The saline-alkali land also provides good topographical conditions for the laying of photovoltaic devices, which is just right for the photovoltaic DC direct-driven membrane capacitive deionization water purification unit (also known as water purification unit, water purification equipment, membrane capacitive deionization water purification equipment, or membrane capacitive deionization equipment) provides excellent prerequisites.

SUMMARY

The technical problem to be solved in this present disclosure is to provide a desalination system of photovoltaic direct-driven membrane capacitive deionization to solve the problem of reliable power supply of the desalination system in the field of saline-alkali land and to achieve the purpose of ecological environment restoration and energy saving and emission reduction.

The technical scheme adopted in this present disclosure to solve the technical problem is: a desalination system of photovoltaic direct-driven membrane capacitive deionization. The system includes a photovoltaic direct-driven group (also called a photovoltaic group or a photovoltaic system) and a municipal power grid-connected group (also called municipal power). The photovoltaic direct-driven group includes a photovoltaic power collection unit (also called a photovoltaic unit or a photovoltaic collection unit), a power storage unit (also called energy storage), a direct-driven power monitoring unit, a voltage adjustment unit, a membrane capacitive deionization water purification unit. The municipal power grid-connected group includes a grid-connected control unit, a grid busbar unit (also known as grid busbar or grid) and an intelligent detection unit (also known as an intelligent detection module); the photovoltaic power collection unit supplies power to the membrane capacitive deionization water purification unit and the power storage unit at the same time or separately; the voltage adjustment unit is located between the photovoltaic power collection unit and the membrane capacitive deionization water purification unit; the power storage unit is connected in parallel with the voltage adjustment unit and located between the photovoltaic power collection unit and the membrane capacitive deionization water purification unit; and the direct-driven power monitoring unit is respectively connected to the power storage unit and the membrane capacitive deionization water purification unit; the grid-connected control unit is located between the photovoltaic power collection unit and the grid busbar unit; and the intelligent detection unit is respectively connected to the grid busbar unit, the grid-connected control unit, and the voltage adjustment unit in the photovoltaic direct-driven group.

In some embodiments, the voltage adjustment unit boosts and stabilizes the photovoltaic direct current to meet needs of the membrane capacitive deionization direct current power supply; the power storage unit obtains surplus electric energy from the photovoltaic power collection unit and stores it, and supplies direct current to the membrane capacitive deionization water purification unit; and the direct-driven power monitoring unit simultaneously monitors electricity consumption of the power storage unit and the membrane capacitive deionization water purification unit, and flexibly allocates between the membrane capacitive deionization water purification unit and the power storage unit.

In some embodiments, when the power storage unit is fully loaded and power supply of the membrane capacitive deionization water purification unit meets a condition, the grid-connected control unit inverts excess electric energy generated by the photovoltaic direct-driven group to the grid busbar unit, and when the photovoltaic direct-driven group do not meet the power supply of the membrane capacitive deionization water purification unit, the grid-connected control unit obtains power from the grid busbar unit to achieve peak shaving compensation; and the intelligent detection unit simultaneously monitors operation status of the municipal power grid-connected group and the photovoltaic direct-driven group, and automatically allocates the power supply in the photovoltaic direct-driven group and the municipal power grid-connected group.

In some embodiments, the voltage adjustment unit includes a voltage booster and a voltage regulator; the voltage booster is used to adjust supplied voltage of the membrane capacitive deionization water purification unit to a required voltage of the membrane capacitive deionization water purification unit, and the voltage regulator is used to control upstream voltage of the membrane capacitive deionization water purification unit.

In some embodiments, the direct-driven power monitoring unit includes a computer, a sensor, and a plurality of switch groups; the sensor is respectively installed on the power storage unit and the voltage adjustment unit, which is used to monitor an electricity consumption state of the membrane capacitive deionization water purification unit and an electricity storage state of the power storage unit; the plurality of switch groups are respectively located between the photovoltaic power collection unit and the power storage unit, between the power storage unit and the membrane capacitive deionization water purification unit, and between the photovoltaic power collection unit and the voltage adjustment unit, which are used to control connection and disconnection of each channel; and the computer is used to collect data obtained by the sensor and formulate a connection and disconnection strategy for each switch group in the plurality of switch groups to switch a working mode of the photovoltaic direct-driven group.

In some embodiments, the grid-connected control unit includes a grid-connected group cabinet, and the grid-connected group cabinet includes an alternating current/direct current (AC/DC) converter, an inverter, and a switch group of the grid-connected group cabinet; the AC/DC converter is located between the grid busbar unit and the voltage adjustment unit in the photovoltaic direct-driven group, which is used to convert grid alternating current into the direct current required by the membrane capacitive deionization water purification unit; the inverter is located between the grid busbar unit and the photovoltaic power collection unit in the photovoltaic direct-driven group, which is used to convert the direct current generated by the photovoltaic collection unit into the alternating current and invert to the grid bus unit; and the switch group of the Grid-Connected group cabinet is used to physically switch a direction of power transmission between the grid busbar unit and the photovoltaic direct-driven group.

In some embodiments, the intelligent detection unit is located between the grid busbar unit and the grid-connected control unit, which is connected to the voltage adjustment unit in the photovoltaic direct-driven group, and the intelligent detection unit performs automatic allocation of electric energy between the municipal power grid-connected group and the photovoltaic direct-driven group.

In some embodiments, the plurality of switch group includes a first switch group, a second switch group, and a third switch group; the first switch group is located between the photovoltaic power collection unit and the voltage adjustment unit, the second switch group is located between the photovoltaic power collection unit and the power storage unit, and the third switch group is located between the power storage unit and the membrane capacitive deionization water purification unit; the first switch group, the second switch group and the third switch group are all normally closed switches.

In some embodiments, the switch group of the grid-connected group cabinet includes a fourth switch group and a fifth switch group, the fourth switch group and the fifth switch group is a normally closed switch; the fourth switch group is located between the inverter and the grid busbar unit, which is used to control the opening and closing of a passage from the photovoltaic direct-driven group to the grid busbar unit, and the fifth switch group is located between the converter and the grid busbar unit, which is used to control opening and closing of a passage of the grid busbar unit to the photovoltaic direct-driven group.

The beneficial effect of this present disclosure is that the defects existing in the background technology are solved, this preset disclosure integrates the photovoltaic system, the power storage system, and the power conversion system organically, which may not only provide stable and reliable direct current (DC) power for the membrane capacitive deionization water purification unit in saline-alkali land, but also realize the direct supply of photovoltaic DC power to the membrane capacitive deionization water purification equipment, and greatly reduce the loss caused by the conversion. At the same time, the instability of photovoltaics may be effectively solved, which may feedback the power grid and achieve the beneficial effects of ecological environment governance and energy conservation and emission reduction.

BRIEF DESCRIPTION OF THE DRAWINGS

FIG. 11 is an exemplary schematic flowchart illustrating an adjustment scheme according to some embodiments of the present disclosure.

DETAILED DESCRIPTION

The present disclosure will now be described in further detail in conjunction with the accompanying drawings and preferred embodiments. These drawings are all simplified schematic diagrams, and only illustrate the basic structure of the present disclosure in a schematic manner, so they only show the structures related to the present disclosure.

As shown in FIGS. 1-8, a desalination system of photovoltaic direct-driven membrane capacitive deionization may use a direct current generated by a photovoltaic power collection unit to directly drive a membrane capacitive deionization water purification unit, convert large amounts of brackish water into high-quality fresh water at a very low cost of power consumption.

Figure 1:
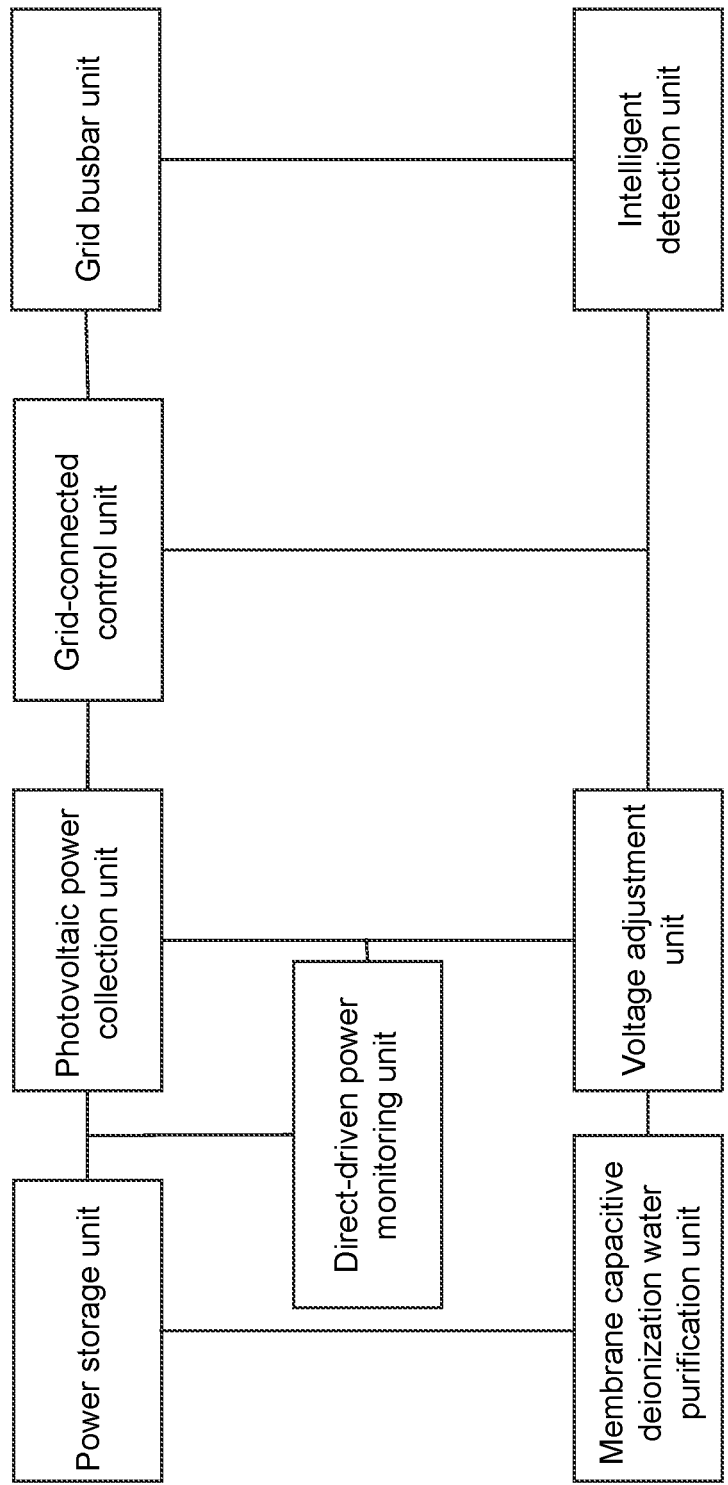
FIG. 1 is a logical structure diagram illustrating a desalination system of photovoltaic direct-driven membrane capacitive deionization according to some embodiments of the present disclosure.

FIG. 1 is a logical structure diagram illustrating a desalination system of photovoltaic direct-driven membrane capacitive deionization according to some embodiments of the present disclosure. As shown in FIG. 1, the desalination system of photovoltaic direct-driven membrane capacitive deionization is divided into two groups, namely photovoltaic direct-driven group and municipal power grid-connected group.

Figure 2:
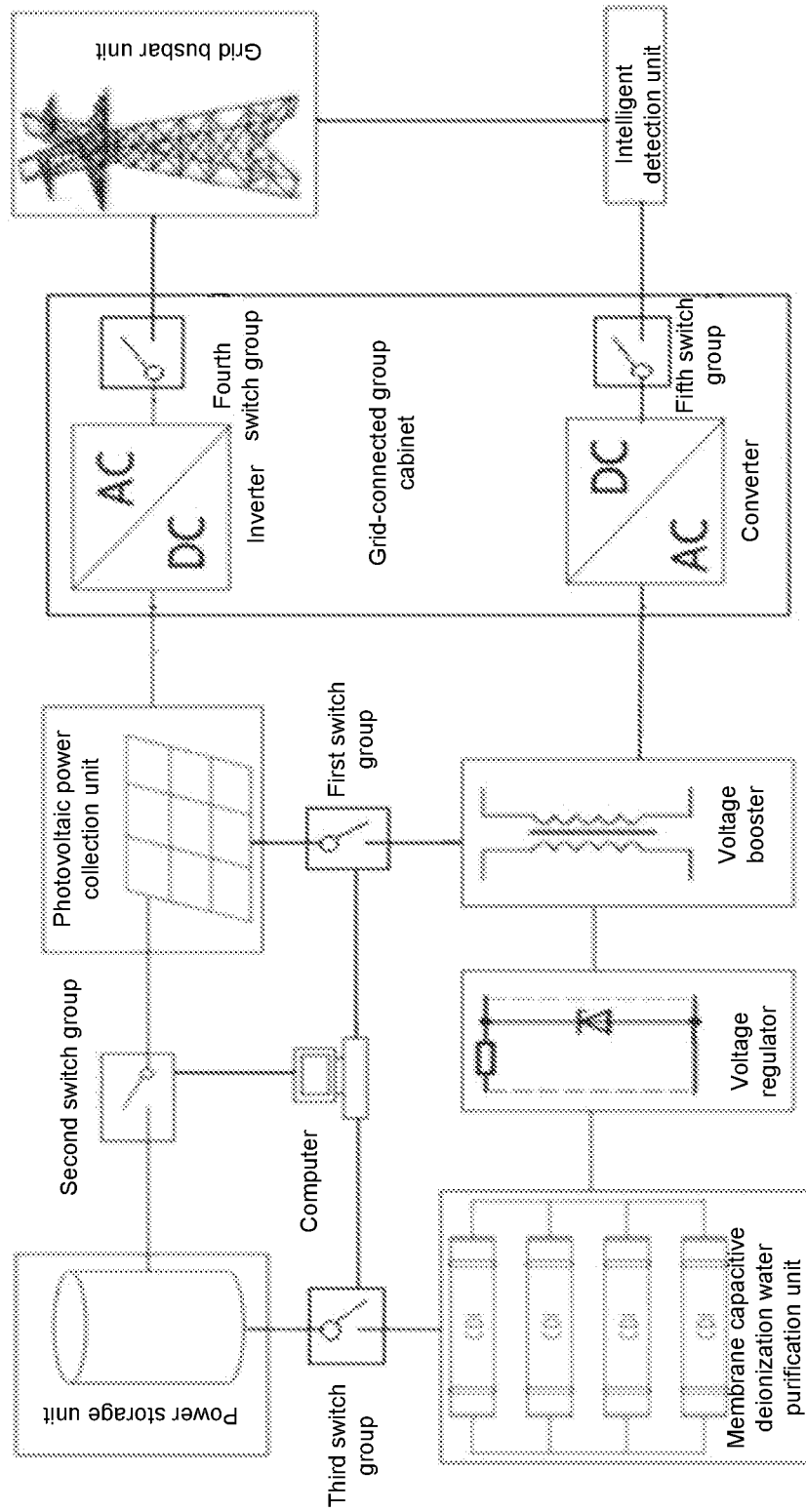
FIG. 2 is a schematic diagram illustrating the constitution of two groups in the desalination system of photovoltaic direct-driven membrane capacitive deionization according to some embodiments of the present disclosure.

FIG. 2 is a schematic diagram illustrating the constitution of the two groups in the desalination system of photovoltaic direct-driven membrane capacitive deionization according to some embodiments of the present disclosure.

The photovoltaic direct-driven group includes a photovoltaic power collection unit, a voltage adjustment unit, a power storage unit, a membrane capacitive deionization water purification unit, and a direct-driven power monitoring unit.

The photovoltaic power collection unit may supply power to the membrane capacitive deionization water purification unit, the power storage unit, and the grid busbar unit.

The municipal power grid-connected group includes a grid-connected control unit, a grid busbar unit, and an intelligent detection unit.

The voltage adjustment unit is located between the photovoltaic power collection unit and the membrane capacitive deionization water purification unit; the power storage unit is connected in parallel with the voltage adjustment unit, and is located between the photovoltaic power collection unit and the membrane capacitive deionization water purification unit; the direct-driven power monitoring unit is respectively connected to the power storage unit and the membrane capacitive deionization water purification unit.

The grid-connected control unit is located between the photovoltaic power collection unit and the grid busbar unit; and the intelligent detection unit is respectively connected to the grid busbar unit, the grid-connected control unit and the voltage adjustment unit in the photovoltaic direct-driven group.

In some embodiments, the voltage adjustment unit boosts and stabilizes the photovoltaic direct current to meet needs of the membrane capacitive deionization direct current power supply; the power storage unit obtains surplus electric energy from the photovoltaic power collection unit and stores it, and supplies the direct current to the membrane capacitive deionization water purification unit; the direct-driven power monitoring unit simultaneously monitors the electricity consumption of the power storage unit and the membrane capacitive deionization water purification unit, and flexibly allocates between the membrane capacitor electric sorption water purification unit and the power storage unit.

The power storage unit is located between the photovoltaic power collection unit and the membrane capacitive deionization water purification unit, and is configured to collect excess photovoltaic power from the photovoltaic power collection unit. The power storage unit is configured for system power compensation when the photovoltaic resources are weak, and supplies power to the membrane capacitive deionization water purification unit. The weak photovoltaic resources may mean that the photovoltaic power generated by the photovoltaic power collection unit is insufficient to meet the power required for water purification by the membrane capacitive deionization water purification unit. For example, when the electric energy required for water purification by the membrane capacitive deionization water purification unit is 100 Kw h, and the photovoltaic power generated by the photovoltaic power collection unit is 90 Kw h at this time, the power storage unit needs to supplement 10 Kw-h electric energy to the membrane capacitive deionization water purification unit. For details about the power storage unit supplying power to the membrane capacitive deionization water purification unit, please refer to the descriptions in other parts of the present disclosure of this present disclosure, for example, FIG. 5, FIG. 6, and related descriptions.

In some embodiments, the direct-driven power monitoring unit includes a computer, a sensor, and a plurality of switch groups; the sensor is respectively installed on the power storage unit and the voltage adjustment unit, which is used to monitor the electricity consumption state of the membrane capacitive deionization water purification unit and the electricity storage state of the power storage unit; the switch groups are respectively located between the photovoltaic power collection unit and the power storage unit, between the power storage unit and the membrane capacitive deionization water purification unit, and between the photovoltaic power collection unit and the voltage adjustment unit, which is used to control a connection and disconnection of each channel; and the computer is used to collect data obtained by the sensor, and formulate a disconnection strategy for each switch group in the multiple switch groups to switch the working mode of the photovoltaic direct-driven group.

For example, when the photovoltaic power generated by the photovoltaic power collection unit exceeds the power required by the membrane capacitive deionization water purification unit, and the power storage unit is not full, and the excess power needs to be stored in the power storage unit, the computer may turn on a second switch for transmission and storage of electrical energy. For details on working mode switching, please refer to the descriptions elsewhere in this present disclosure, for example, FIGS. 3-8 and related descriptions. The switching of the working mode of the photovoltaic direct-driven group may be realized by opening and closing of the switch group controlled by the computer, the use of electric energy may be reasonably planned, and the waste of energy may be avoided.

In some embodiments, the switch group includes a first switch group, a second switch group, and a third switch group; the first switch group is located between the photovoltaic power collection unit and the voltage adjustment unit, the second switch group is located between the photovoltaic power collection unit and the power storage unit, and the third switch group is located between the power storage unit and the membrane capacitive deionization water purification unit; and the first switch group, the second switch group, and the third switch group are all normally closed switches.

The direct-driven power monitoring unit is configured to flexibly allocate between the membrane capacitive deionization water purification unit and the power storage unit. In some embodiments, when the electric energy collected by the photovoltaic power collection unit exceeds the electric energy required by the membrane capacitive deionization water purification unit, the direct-driven power monitoring unit may store the surplus electric energy in the power storage unit for storage. The direct-driven power monitoring unit includes a sensor, a computer, and a plurality of switch groups, and the plurality of switch groups may include, for example, a first switch group, a second switch group, and a third switch group, and the switch groups are all normally closed switches.

The sensors are installed in the power storage unit and the voltage adjustment unit respectively, which are respectively used to monitor the energy collection state of the power storage unit and judge the electricity consumption state of the membrane capacitive deionization water purification unit through the working characteristics of the voltage adjustment unit. For example, a voltage sensor may be disposed in the voltage adjustment unit and the power storage unit respectively, the voltage sensor may obtain the instantaneous voltage of the voltage adjustment unit and the power storage unit. When the instantaneous voltage output by the voltage adjustment unit remains unchanged, it means that the electrical energy required by the membrane capacitive deionization water purification unit is sufficient at this time.

The computer sends an opening and closing command to the switch groups according to the sensor signal to adjust and control the working mode of the photovoltaic direct-driven group. The first switch group is located between the photovoltaic power collection unit and the voltage adjustment unit, the second switch group is located between the photovoltaic power collection unit and the power storage unit, and the third switch group is located between the power storage unit and the membrane capacitive deionization water purification unit, and the switch groups are respectively used to realize opening and closing of the power paths where they are located.

For example, when the sensor installed in the photovoltaic power collection unit collects a signal, it means that the photovoltaic power collection unit has collected more electric energy than the electric energy required by the membrane capacitive deionization water purification unit, and the power storage unit is not full, and the excess electric energy needs to be stored in the power storage unit, the computer may issue an instruction to open the second switch according to the signal of the sensor, and open the second switch to transmit and store electrical energy. For details about adjusting and controlling the working mode of the photovoltaic direct-driven group, please refer to the descriptions in other parts of the present disclosure of this present disclosure, for example, FIGS. 4 and 5, and related descriptions.

In some embodiments, the voltage adjustment unit includes a voltage booster and a voltage regulator; the voltage booster is configured to adjust supplied voltage to the membrane capacitive deionization water purification unit to a required voltage; the voltage regulator is used to control upstream voltage of the membrane capacitive deionization water purification unit.

The voltage adjustment unit is located between the photovoltaic power collection unit and the membrane capacitive deionization water purification unit, and is connected in parallel with the power storage unit, it includes a voltage booster and a voltage regulator, the voltage booster is configured to boost the voltage supplied by the membrane capacitive deionization water purification unit to the voltage required by the membrane capacitive deionization water purification unit, i.e., 340 V~480 V, the voltage regulator is configured to control the upstream voltage of the membrane capacitive deionization water purification unit during stable operation to ensure the high efficiency, high quality and reliability of the produced water.

The municipal power grid-connected group includes a grid-connected control unit, a grid busbar unit, and an intelligent detection unit.

In some embodiments, when the power storage unit is fully loaded and the power supply of the membrane capacitive deionization water purification unit is satisfied, the grid-connected control unit inverts the excess electric energy generated by the photovoltaic direct-driven group to the grid busbar unit. When the photovoltaic direct-driven group does not meet the power supply of the membrane capacitive deionization water purification unit, the grid-connected control unit takes power from the grid busbar unit to achieve peak shaving compensation. The intelligent detection unit simultaneously monitors the running status of the grid-connected group and the photovoltaic direct-driven group, and automatically allocates power in the two groups.

For example, the photovoltaic direct-driven group meets the electric energy required by the membrane capacitive deionization water purification unit, and the electric energy in the power storage unit has been fully stored. At this time, the excess electric energy may flow into the municipal power grid-connected group to supply the needs of municipal power. On the contrary, when the photovoltaic direct-driven group does not meet the electric energy required by the membrane capacitive deionization water purification unit, the municipal power grid-connected group may supply power to the photovoltaic direct-driven group. For details about the automatic allocation of power between the grid-connected group and the photovoltaic direct-driven group, please refer to the descriptions elsewhere in this present disclosure, for example, FIGS. 3 and 7 and related descriptions. Based on monitoring the operation status of the grid-connected group and the photovoltaic direct-driven group, automatically and flexibly allocating the electric energy of the municipal power grid-connected group and the photovoltaic direct-driven group may dynamically meet the electricity demand of the municipal power grid-connected group and the photovoltaic direct-driven group, which may not only ensure the electricity demand of purified water and mains, but also prevent the waste of electricity.

In some embodiments, the grid-connected control unit includes a grid-connected group cabinet, and the grid-connected group cabinet includes an AC/DC converter, an inverter, and a switch group of the grid-connected group cabinet; the AC/DC converter is located between the grid busbar unit and the voltage adjustment unit in the photovoltaic direct-driven group, the AC/DC converter is used to convert the alternating current of the grid into the direct current required by the membrane capacitive deionization water purification unit; the inverter is located between the grid busbar unit and the photovoltaic power collection unit in the photovoltaic direct-driven group, the inverter is configured to convert the direct current generated by the photovoltaic collection unit into the alternating current and invert to the grid bus unit; the switch group of the grid-connected group cabinet is configured to physically switch a direction of power transmission between the grid busbar unit and the photovoltaic direct-driven group.

For example, when the excess power generated by the photovoltaic collection unit needs to be delivered to the grid busbar unit, it may reach the grid busbar unit through an inverter and a fourth switch group of the grid-connected control unit. For another example, when the municipal power needs to be delivered to the membrane capacitive deionization water purification unit, it may reach the membrane capacitive deionization water purification unit through a fifth switch group and the AC/DC converter of the grid-connected control unit. For details about the use of the grid-connected control unit in the working mode, please refer to FIGS. 3, 6 and 7 and related descriptions. Through the setting of the grid-connected control unit, the alternating current of the municipal power and the direct current required by the membrane capacitive deionization water purification unit may be converted into each other, which ensures the automatic and flexible electric energy between the grid-connected group of the municipal power and the photovoltaic direct-driven group.

In some embodiments, the switch group of the grid-connected group cabinet includes a fourth switch group and a fifth switch group, the fourth switch group and the fifth switch group is a normally closed switch; the fourth switch group is located between the inverter and the grid busbar unit, and is used to control opening and closing of the passage from the photovoltaic direct-driven group to the grid busbar unit, the fifth switch group is located between the converter and the grid busbar unit, and controls opening and closing of the grid busbar unit to the photovoltaic direct-driven group.

For example, when the electric energy needs to be controlled to flow from the grid-connected control unit to the membrane capacitive deionization water purification unit, the fifth switch group may be turned on through computer control. For another example, when it is necessary to control the flow of electric energy from the photovoltaic power collection unit to the grid-connected control unit, the fourth switch group may be turned on through computer control. For details about the switch group of the Grid-Connected group cabinet, please refer to the descriptions elsewhere in this present disclosure, for example, FIGS. 3, 6, and 7, and related descriptions.

The grid-connected control unit includes a grid-connected group cabinet, and the grid-connected group cabinet includes an AC/DC converter, an inverter, and a switch group of grid-connected group cabinet. In some embodiments, the switch group of the Grid-Connected group cabinet may be composed of multiple groups of switches. For example, the switch group of the Grid-Connected group cabinet may include a fourth switch group switch and a fifth switch group. The grid-connected control unit may be configured to invert the excess electric energy generated by the photovoltaic direct-driven group to the grid busbar unit when the power storage unit is fully loaded and the membrane capacitive deionization water purification unit supplies power. When the photovoltaic direct-driven group does not meet the power supply of the membrane capacitive deionization water purification unit, the grid-connected control unit takes electricity from the grid busbar unit to achieve the purpose of peak shaving compensation. For details about the grid-connected control unit, please refer to the descriptions in other parts of the present disclosure of this present disclosure, for example, FIG. 7 and related descriptions.

The grid-connected group cabinet is used to accommodate functional components such as an assemble converter, an inverter, a fourth switch group, and a fifth switch group, and provide safety protection and convenient conditions for personnel to operate.

The AC/DC converter is located in the grid-connected group cabinet and between the grid busbar unit and the voltage adjustment unit in the photovoltaic direct-driven group, which is used to convert alternating current power of the grid into the direct current power required by the membrane capacitive deionization water purification unit.

The inverter is located in the grid-connected group cabinet and is located between the grid busbar unit and the photovoltaic power collection unit in the photovoltaic direct-driven group, which is configured to convert the direct current generated by the photovoltaic power collection unit into the alternating current and invert to the grid busbar unit, realizing the back-feeding of the photovoltaic system to the power grid.

The fourth switch group and the fifth switch group are located in the grid-connected group cabinet, the fourth switch group is located between the inverter and the grid busbar unit, and controls opening and closing of the path from the photovoltaic direct-driven group to the grid busbar unit, the fifth switch group is located between the converter and the grid busbar unit, and controls opening and closing of the grid busbar unit to the photovoltaic direct-driven group. The fourth switch group and the fifth switch group are normally closed switches.

The intelligent detection unit is located between the grid busbar unit and the grid-connected control unit, and is connected to the voltage adjustment unit in the photovoltaic direct-driven group, which is configured to monitor the operation status of the grid-connected group and the photovoltaic direct-driven group at the same time, performing automatic allocation of power consumption in the two groups.

The following is detailed descriptions of the six working modes of the photovoltaic direct-driven membrane capacitive deionization desalination system.

In some embodiments, the intelligent detection unit is located between the grid busbar unit and the grid-connected control unit and is connected to the voltage adjustment unit in the photovoltaic direct-driven group, and the intelligent detection unit automatically allocates electric energy between the grid-connected group of the municipal power and the photovoltaic direct-driven group.

Figure 3:
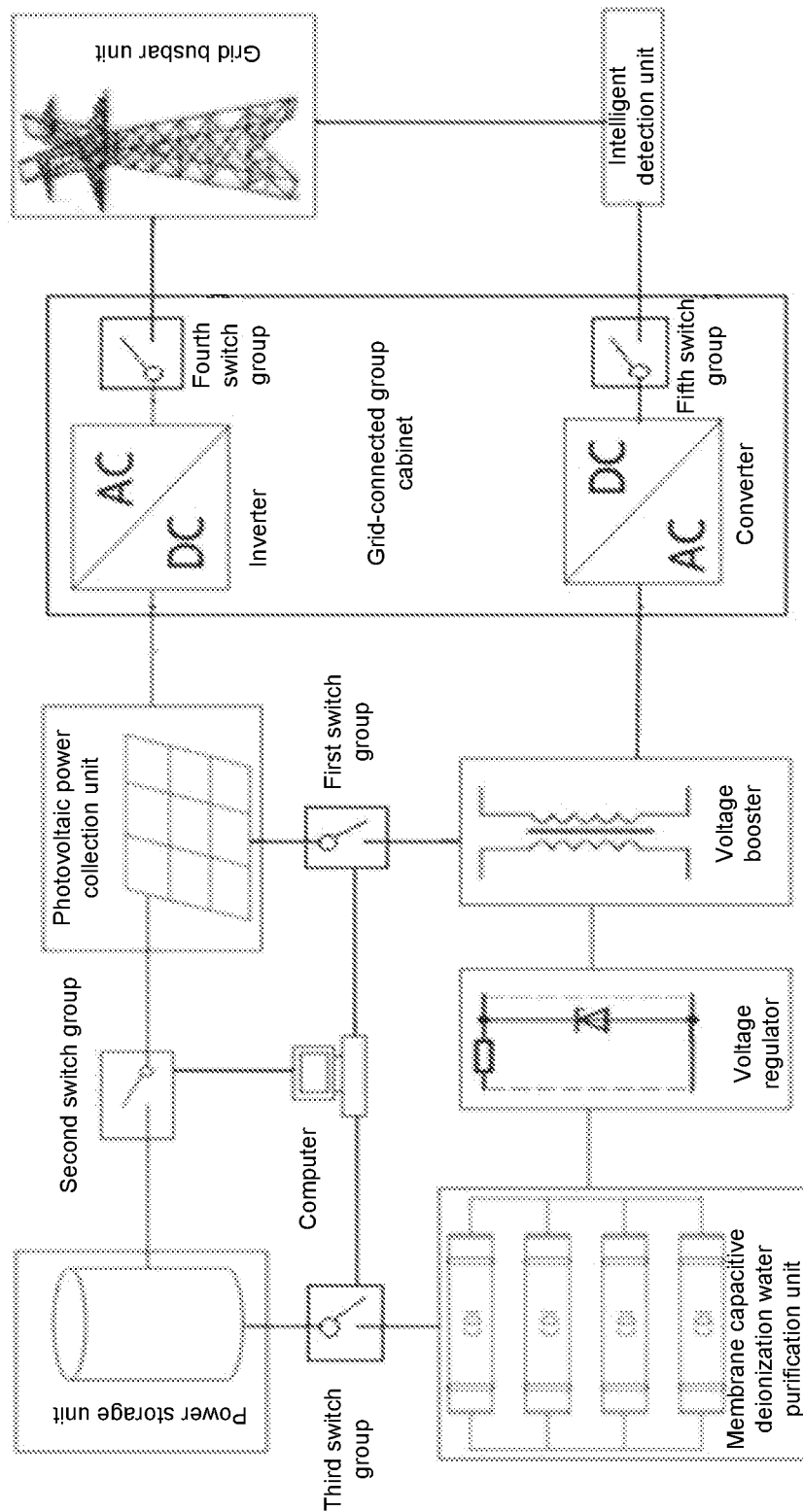
FIG. 3 is a schematic diagram illustrating a first working mode of the desalination system of photovoltaic direct-driven membrane capacitive deionization according to some embodiments of the present disclosure.

FIG. 3 is a schematic diagram illustrating a first working mode of the desalination system of photovoltaic direct-driven membrane capacitive deionization according to some embodiments of the present disclosure. In the first working mode, the photovoltaic power collection unit and the grid-connected group of municipal power supply power to the membrane capacitor electric-absorption water purification unit at the same time. The preconditions for this scenario are that: the power storage unit cannot work, and the electric energy provided by the photovoltaic power collection unit cannot fully meet the membrane capacitive deionization water purification unit. For example, when the electrical energy required by the membrane capacitive deionization water purification unit is 200 Kw-h, the energy in the power storage unit has been used up, which is 0 Kw h, and at this time, the power provided by the photovoltaic power collection unit may be 100 Kw-h, and the photovoltaic direct-driven group cannot provide enough power for the membrane capacitive deionization water purification unit.

Therefore, the sensor of the power storage unit sends a fault signal to the computer in the direct-driven power monitoring unit, and the computer sends an instruction to the second switch group and the third switch group, and the second switch group and the third switch group are disconnected. At the same time, the intelligent detection unit in the municipal power grid-connected group generates a signal to the fourth switch group in the grid-connected group cabinet, the fourth switch group is disconnected, and the intelligent detection unit generates a signal to the fifth switch group in the grid-connected group cabinet, the fifth switch group is closed.

As shown in FIG. 3, the direction of the black arrow represents the flow of electric energy. On the one hand, the electric energy generated by the photovoltaic power collection unit enters the membrane capacitive deionization water purification unit through the first switch group, the voltage booster and the voltage regulator of the voltage adjustment unit. On the other hand, the power of the grid busbar unit passes through the intelligent detection module, the fifth switch group of the grid-connected group cabinet in the grid-connected control unit, and the AC/DC converter, and then it enters the membrane capacitive deionization water purification unit through the voltage booster and voltage regulator of the voltage adjustment unit.

Figure 4:
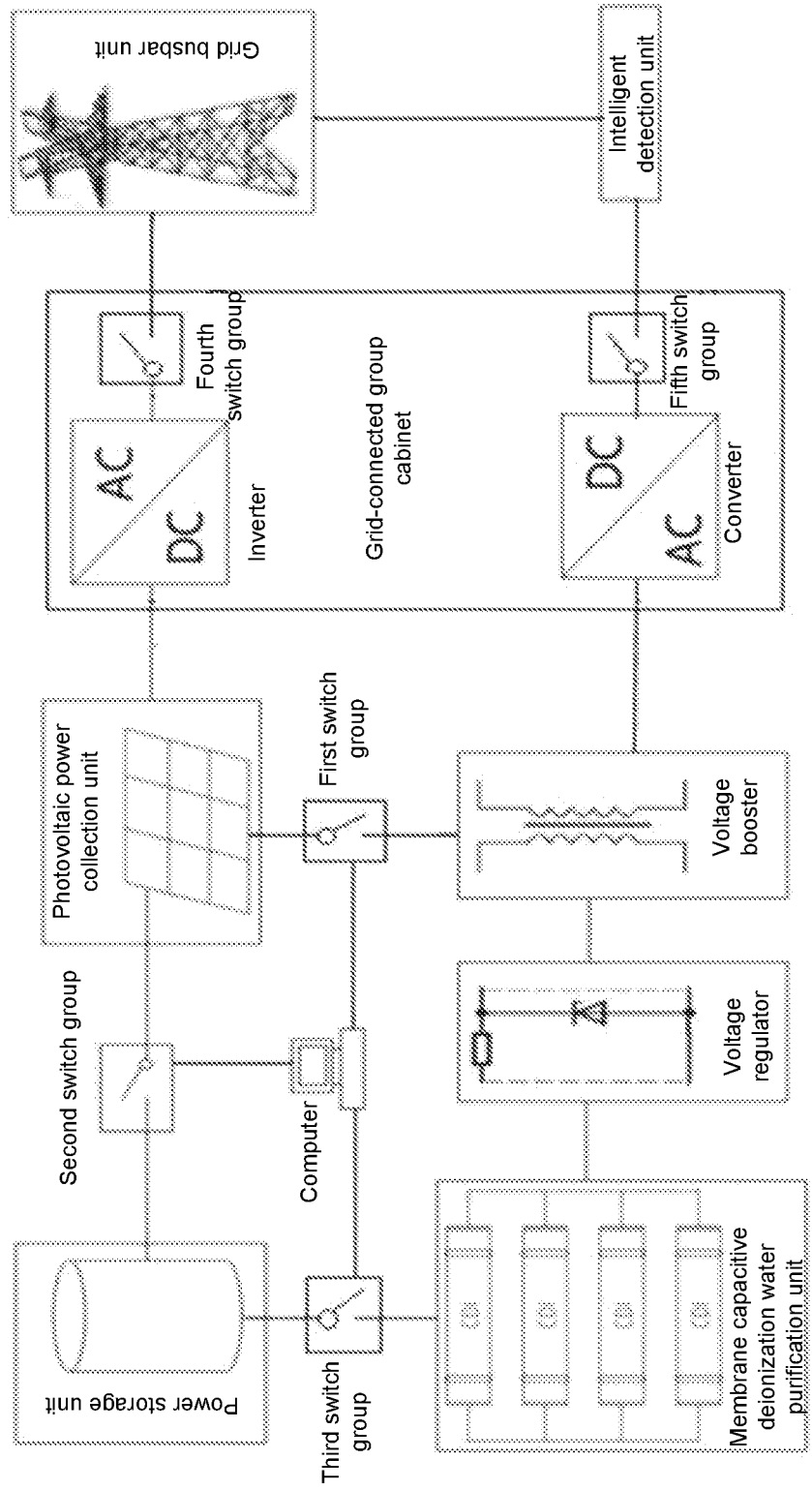
FIG. 4 is a schematic diagram illustrating a second working mode of the desalination system of photovoltaic direct-driven membrane capacitive deionization according to some embodiments of the present disclosure.

FIG. 4 is a schematic diagram illustrating a second working mode of the desalination system of photovoltaic direct-driven membrane capacitive deionization according to some embodiments of the present disclosure. In the second working mode, the photovoltaic power collection unit supplies power to the membrane capacitive deionization water purification unit and the power storage unit at the same time. The precondition for this scenario is that the electric energy generated by the photovoltaic power collection unit is greater than the electric energy required by the membrane capacitive deionization water purification unit, and the power storage unit is not yet fully charged. For example, when the electric energy required by the membrane capacitive deionization water purification unit is 100 Kw-h, the photovoltaic power collection unit converts the light energy into electric energy of 200 Kw-h, and the power storage unit is not yet fully charged. Therefore, the sensor of the power storage unit sends the signal to be charged to the computer in the direct-driven power monitoring unit, the computer sends an instruction to the third switch group, and the third switch group is turned off. At the same time, the intelligent detection unit in the municipal power grid-connected group generates a signal to the fourth switch group and the fifth switch group in the grid-connected group cabinet, and the fourth switch group and the fifth switch group are simultaneously disconnected.

As shown in FIG. 4, the direction of the black arrow indicates the flow of electric energy. On the one hand, the electric energy generated by the photovoltaic power collection unit enters the membrane capacitive deionization water purification unit through the first switch group, the voltage booster and the voltage regulator of the voltage adjustment unit. On the other hand, the electric energy generated by the photovoltaic power collection unit enters the power storage unit through the second switch group for storage.

Figure 5:
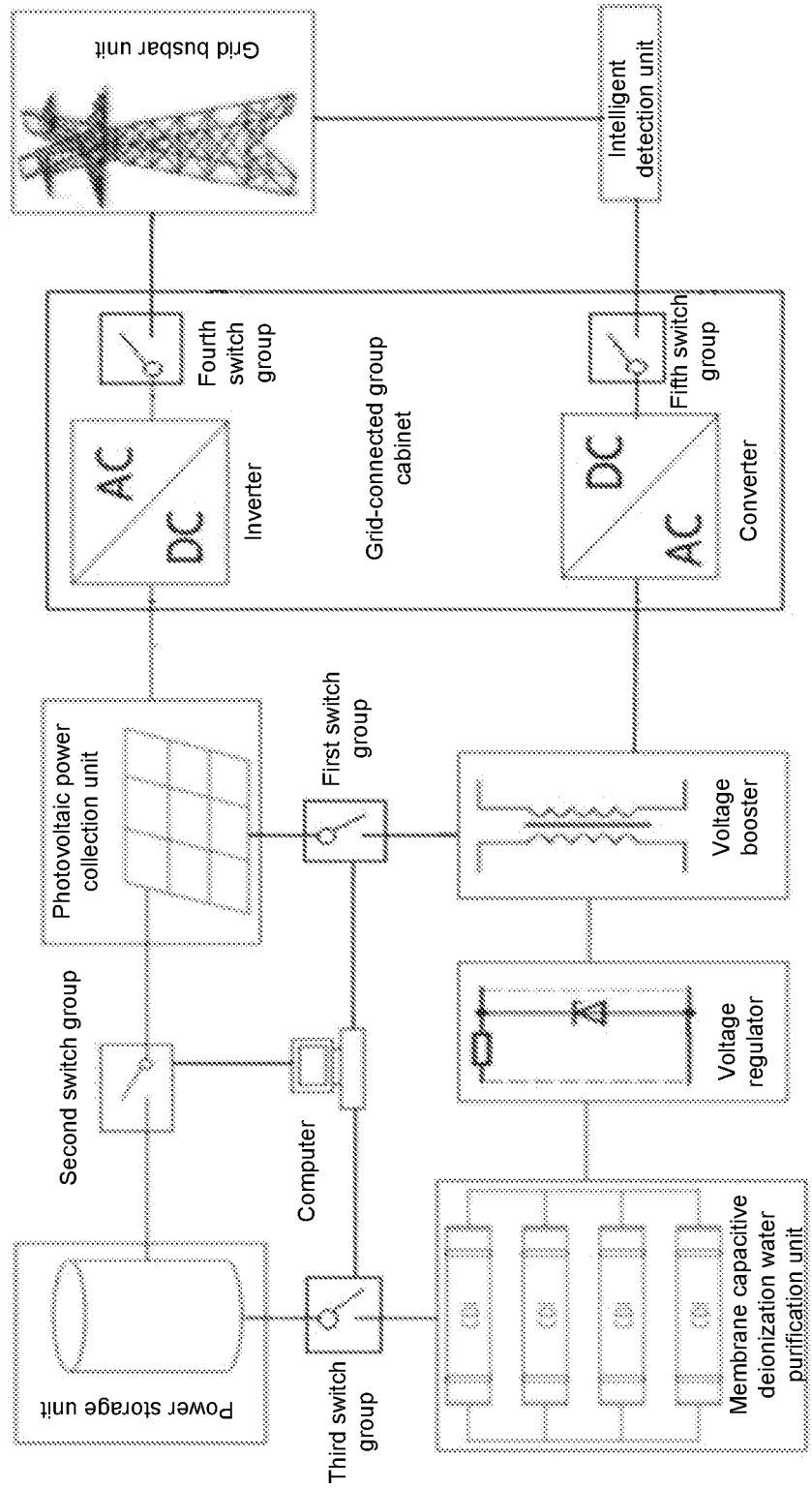
FIG. 5 is a schematic diagram illustrating a third working mode of the desalination system of photovoltaic direct-driven membrane capacitive deionization according to some embodiments of the present disclosure.

FIG. 5 is a schematic diagram illustrating a third working mode of the desalination system of photovoltaic direct-driven membrane capacitive deionization according to some embodiments of the present disclosure. In the third working mode, the photovoltaic power collection unit and the power storage unit simultaneously supply power to the membrane capacitive deionization water purification unit. The precondition for this scenario is that the municipal power grid-connected group is powered off, and the electric energy provided by the photovoltaic power collection unit is not enough to provide enough electric energy to the membrane capacitive deionization water purification unit. For example, when the electric energy required by the membrane capacitive deionization water purification unit is 200 Kw-h, the municipal power grid-connected group cannot provide electric power, and the electric energy provided by the photovoltaic power collection unit is 100 Kw-h. Therefore, the computer in the direct-driven power monitoring unit sends an instruction to the second switch group, and the second switch group is turned off. The intelligent detection unit in the municipal power grid-connected group generates signals to the fourth switch group and the fifth switch group in the grid-connected group cabinet, and the fourth switch group and the fifth switch group are simultaneously disconnected.

As shown in FIG. 5, the direction of the black arrow indicates the flow of electric energy. On the one hand, the electric energy generated by the photovoltaic power collection unit enters the membrane capacitive deionization water purification unit through the first switch group, the voltage booster and the voltage regulator of the voltage adjustment unit. On the other hand, the electric energy in the power storage unit enters the membrane capacitive deionization water purification unit through the third switch group.

Figure 6:
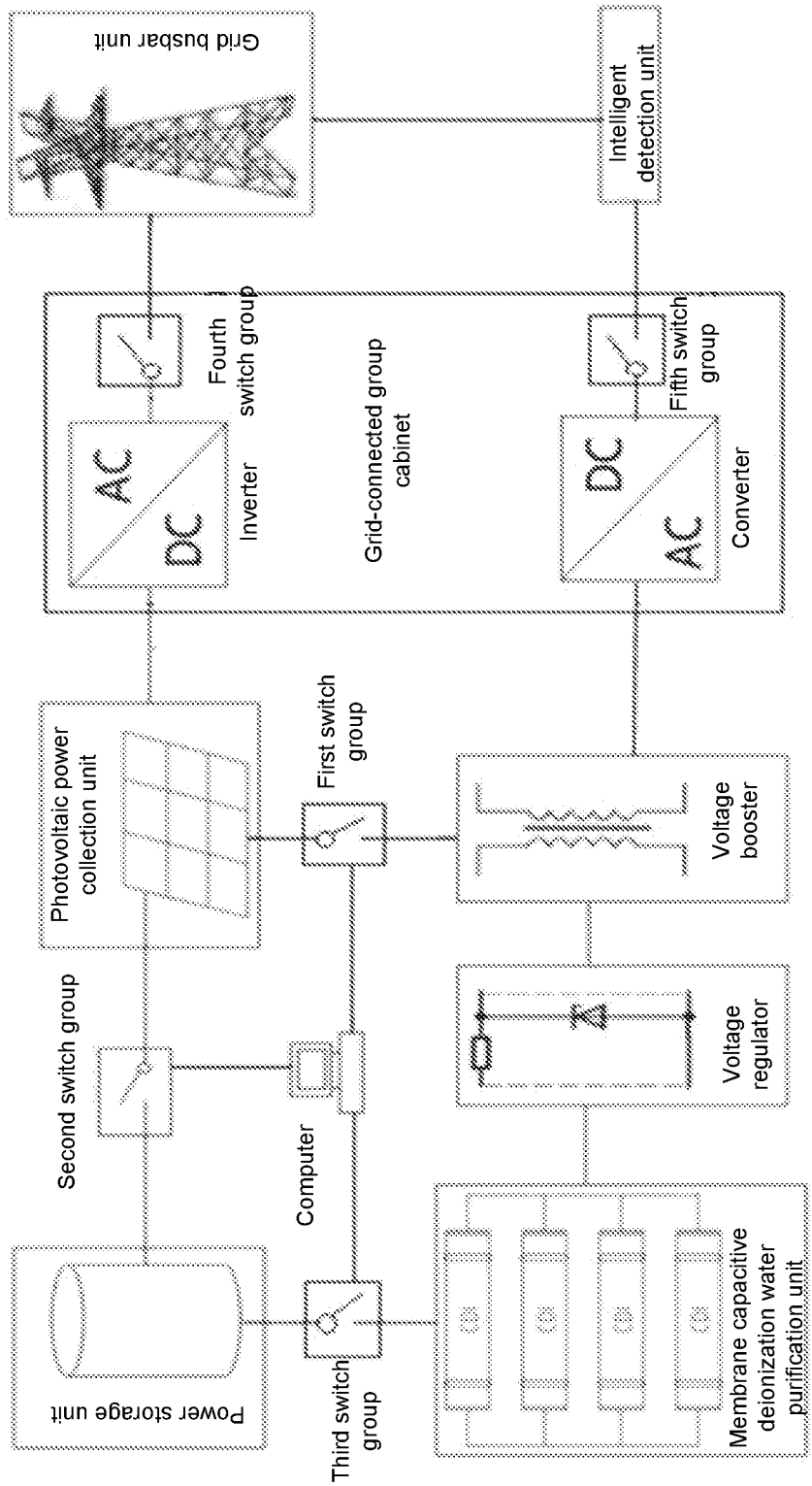
FIG. 6 is a schematic diagram illustrating a fourth working mode of the desalination system of photovoltaic direct-driven membrane capacitive deionization according to some embodiments of the present disclosure.

FIG. 6 is a schematic diagram illustrating a fourth working mode of the desalination system of photovoltaic direct-driven membrane capacitive deionization according to some embodiments of the present disclosure. In the fourth working mode, the photovoltaic power collection unit, the power storage unit, and the grid-connected group of the municipal power supply the membrane capacitive deionization water purification unit at the same time. At this time, the prerequisite scenario conditions are: the municipal power grid-connected group is not powered off, and the simultaneous operation of the photovoltaic power collection unit and the power storage unit cannot meet the power supply needs of the membrane capacitive deionization water purification unit.

For example, when the electric energy required by the membrane capacitive deionization water purification unit is 200 Kw-h, the electric energy provided by the photovoltaic power collection unit is 100 Kw-h, the electric energy provided by the power storage unit is 50 Kw-h, and municipal power grid-connected group provide the remaining 50 Kw-h of power. Therefore, the computer in the direct-driven power monitoring unit sends an instruction to the second switch group, and the second switch group is turned off. At the same time, the intelligent detection unit in the municipal power grid-connected group generates a signal to the fourth switch group in the grid-connected group cabinet, and the fourth switch group is turned off.

As shown in FIG. 6, the direction of the black arrow indicates the flow of electric energy. On the one hand, the electric energy generated by the photovoltaic power collection unit enters the membrane capacitive deionization water purification unit through the first switch group, the voltage booster and the voltage regulator of the voltage adjustment unit. On the other hand, the electric energy in the power storage unit enters the membrane capacitive deionization water purification unit through the third switch group. In the third aspect, the electric energy of the grid busbar unit passes through the intelligent detection module, the fifth switch group of the Grid-Connected group cabinet in the grid-connected control unit, and the AC/DC converter, and then enters the membrane capacitive deionization water purification unit through the voltage booster and voltage regulator of the voltage adjustment unit.

Figure 7:
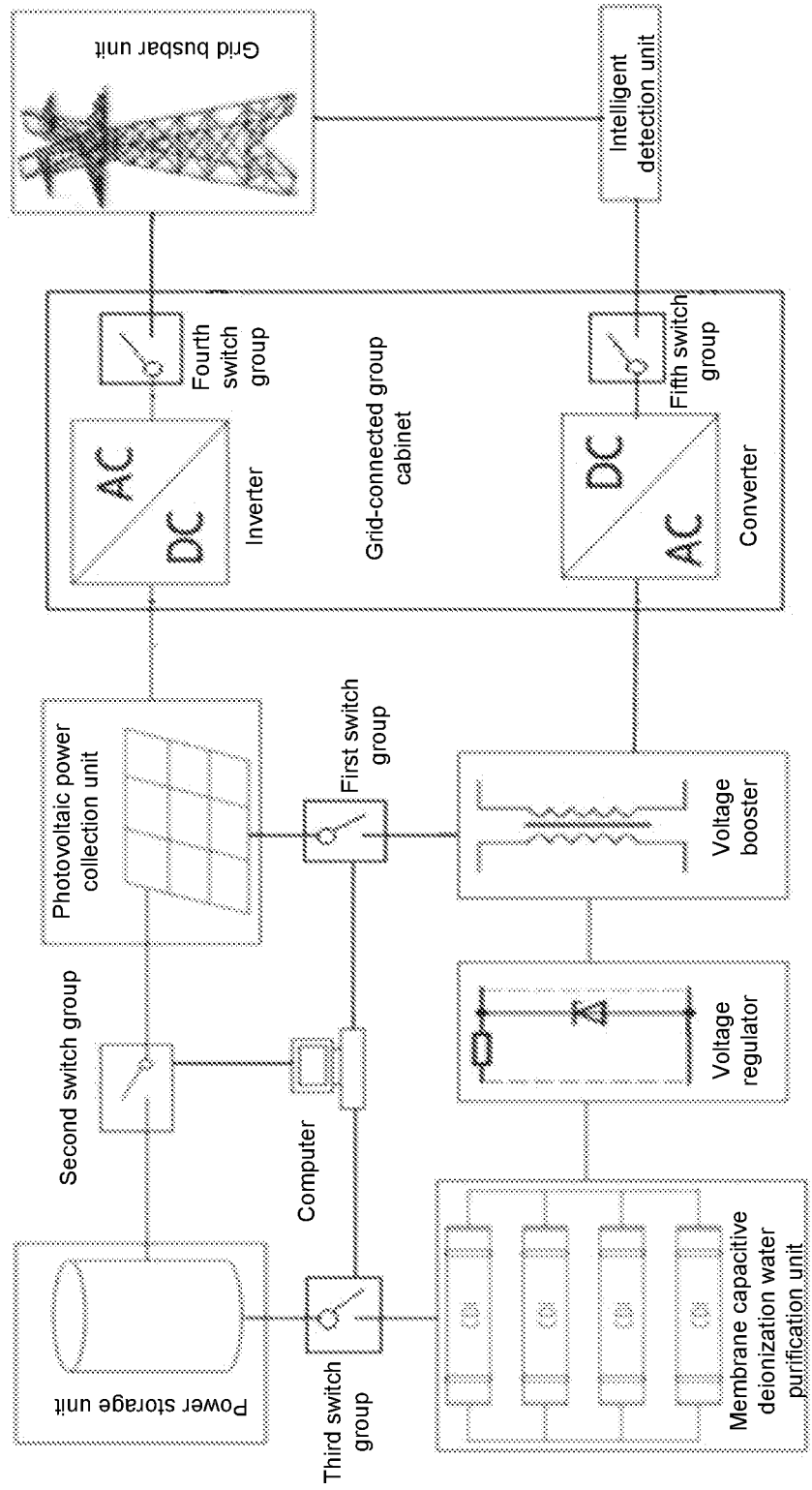
FIG. 7 is a schematic diagram illustrating a fifth working mode of the desalination system of photovoltaic direct-driven membrane capacitive deionization according to some embodiments of the present disclosure.

FIG. 7 is a schematic diagram illustrating a fifth working mode of the desalination system of photovoltaic direct-driven membrane capacitive deionization according to some embodiments of the present disclosure. In the fifth working mode, the photovoltaic power collection unit supplies power to the membrane capacitive deionization water purification unit, and at the same time inverts the surplus power to the grid busbar unit, and feedbacks the municipal power grid-connected group. The preconditions at this time are: the power storage unit is fully charged or unable to work, and the electric energy generated by the photovoltaic power collection unit is greater than the electric energy required by the membrane capacitive deionization water purification unit.

For example, when the electric energy required by the membrane capacitive deionization water purification unit is 100 Kw-h, and the electric energy provided by the photovoltaic power collection unit is 200 Kw-h, the power storage unit is fully charged. Therefore, the sensor of the power storage unit sends a full load or fault signal to the computer in the direct-driven power monitoring unit, and the computer sends an instruction to the second switch group and the third switch group, and the second switch group and the third switch group are disconnected. At the same time, the intelligent detection unit in the municipal power grid-connected group generates a signal to the fifth switch group in the grid-connected group cabinet, and the fifth switch group is turned off.

As shown in FIG. 7, the direction of the black arrow indicates the flow of electric energy. On the one hand, the electric energy generated by the photovoltaic power collection unit enters the membrane capacitive deionization water purification unit through the first switch group, the voltage booster and the voltage regulator of the voltage adjustment unit. On the other hand, the electric energy generated by the photovoltaic power collection unit enters the grid busbar unit through the inverter and the fourth switch group of the grid-connected group cabinet in the grid-connected control unit.

Figure 8:
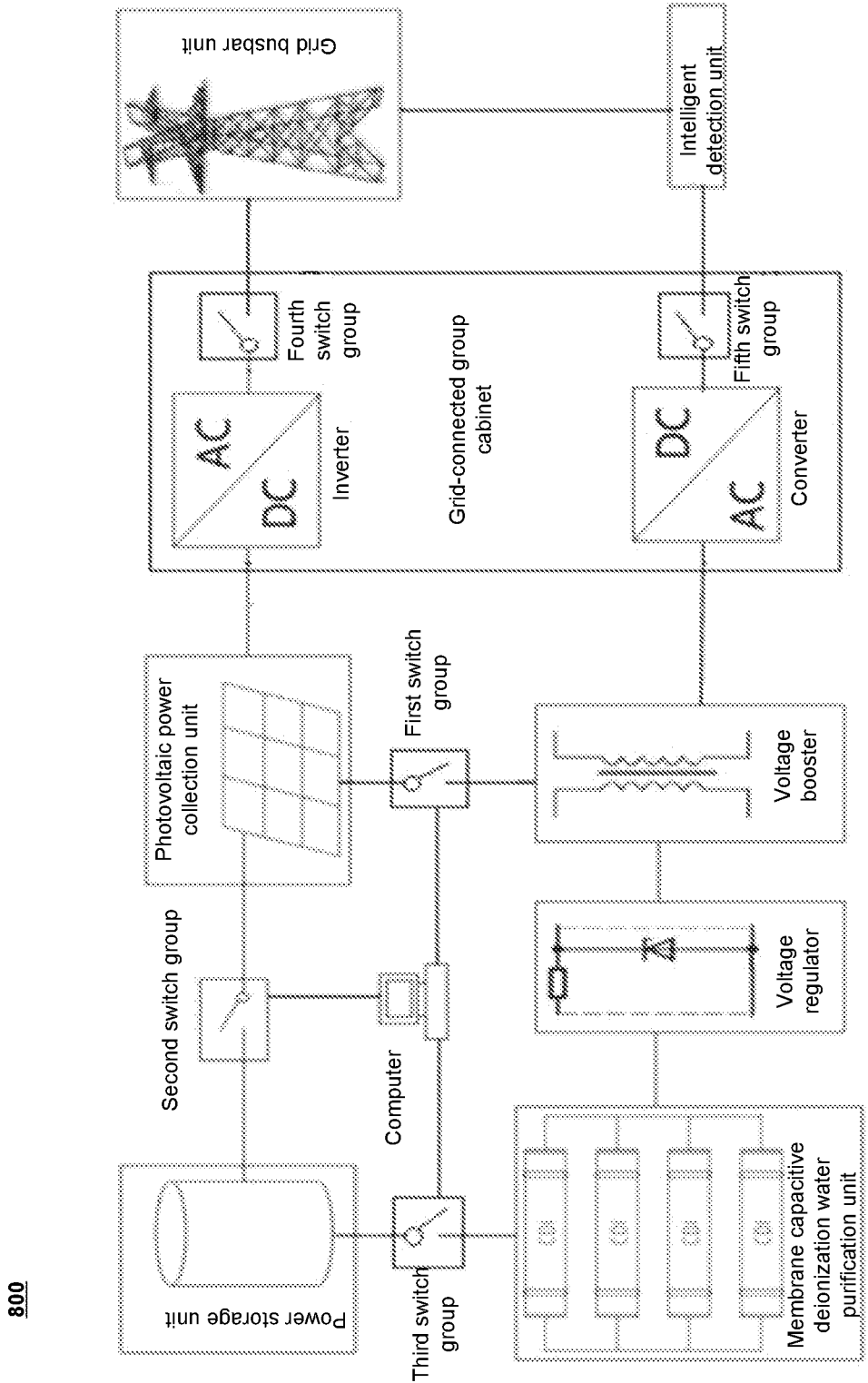
FIG. 8 is a schematic diagram illustrating a sixth working mode of the desalination system of photovoltaic direct-driven membrane capacitive deionization according to some embodiments of the present disclosure.

FIG. 8 is a schematic diagram illustrating a sixth working mode of the desalination system of photovoltaic direct-driven membrane capacitive deionization according to some embodiments of the present disclosure. In the sixth working mode, only the photovoltaic power collection unit supplies power to the membrane capacitive deionization water purification unit. The prerequisite scene condition at this time is that the electric energy generated by the photovoltaic power collection unit in the photovoltaic direct-driven group just meets the needs of the membrane capacitive deionization water purification unit.

For example, when the electric energy required by the membrane capacitive deionization water purification unit is 100 Kw-h, the electric energy provided by the photovoltaic power collection unit is 100 Kw-h. Therefore, the computer in the direct-driven power monitoring unit sends an instruction to the second switch group and the third switch group, and the second switch group and the third switch group are turned off simultaneously. At the same time, the intelligent detection unit in the municipal power grid-connected group generates a signal to the fourth switch group and the fifth switch group in the grid-connected group cabinet, and the fourth switch group and the fifth switch group are simultaneously disconnected.

As shown in FIG. 8, the direction of the black arrow indicates the flow of electric energy, and the electric energy generated by the photovoltaic power collection unit only enters the membrane capacitive deionization water purification unit through the first switch group, the voltage booster and the voltage regulator of the voltage adjustment unit.

By realizing the different working modes of the desalination system of photovoltaic direct-driven membrane capacitive deionization, the electric energy may be reasonably planned, and a large amount of brackish water may be converted into high-quality fresh water at a very low power consumption cost, and in the case of meeting the electricity demand of the membrane capacitive deionization water purification unit, the adsorption efficiency is improved, and the use of municipal power is reduced. The descriptions of the working modes of the desalination system of photovoltaic direct-driven membrane capacitive deionization is for illustrative purposes and is not intended to limit the scope of protection of the present disclosure.

The above working modes are some main embodiments of this present disclosure, and are not intended to limit this present disclosure. The conditions that may be faced under the actual scene conditions include: increase or decrease in the number of membrane capacitive deionization water purification units and adjustment of total power, changes in installed capacity of photovoltaic systems, changes in grid connection conditions, etc. The above-described embodiments have taken such scenarios into account, i.e., this present disclosure has provided sufficient system flexibility for changes in usage scenario conditions.

When the actual scene conditions face more changes, those skilled in the art can make full use of the system flexibility provided in this present disclosure to adjust and modify the system working modes, however, any modifications made within the principles of this present disclosure are included within the scope of the claims of this present disclosure.

Figure 9:
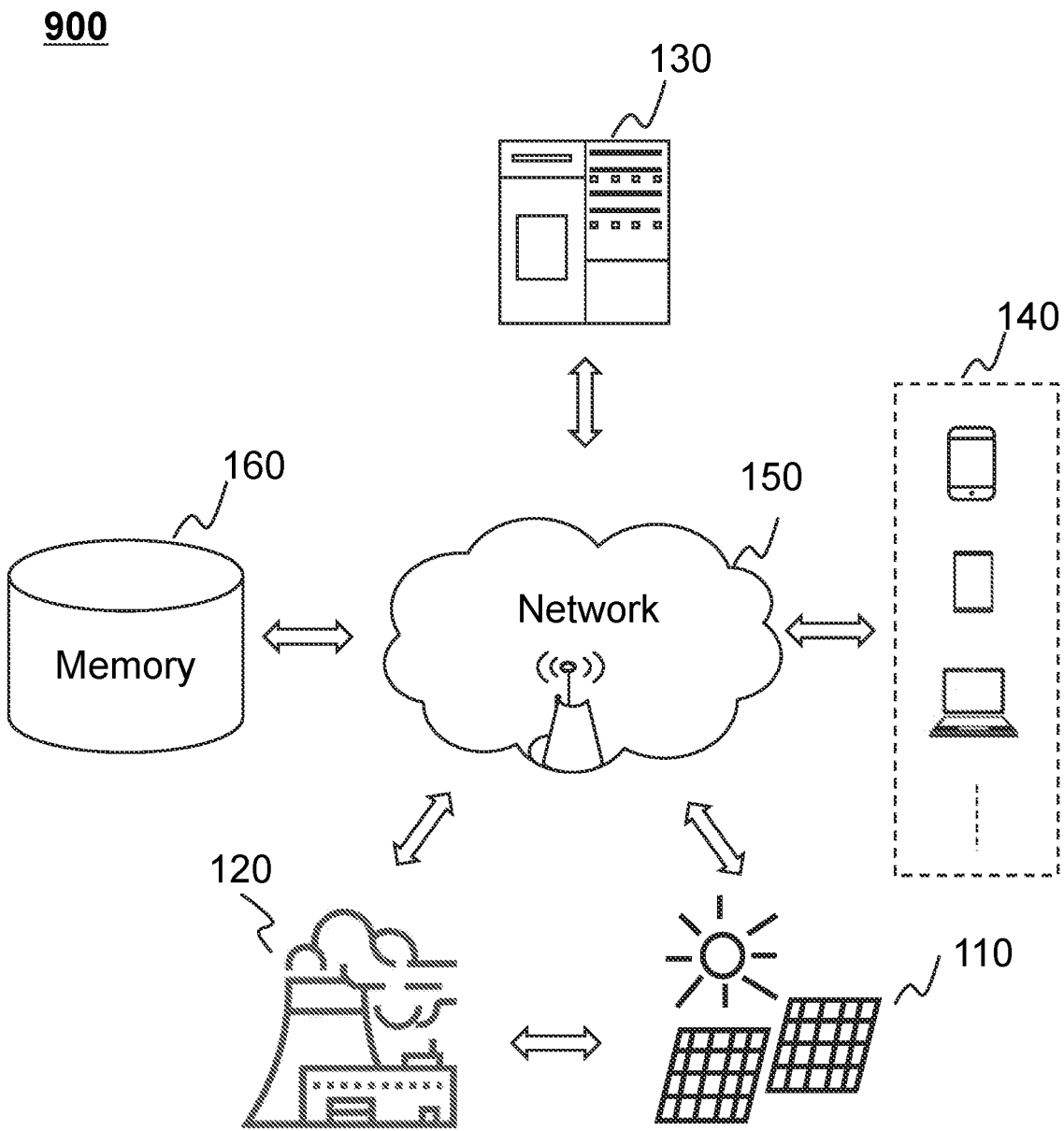
FIG. 9 is a schematic diagram illustrating an application scenario of the desalination system of photovoltaic direct-driven membrane capacitive deionization according to some embodiments of the present disclosure.

FIG. 9 is a schematic diagram illustrating an application scenario of the desalination system of photovoltaic direct-driven membrane capacitive deionization according to some embodiments of the present disclosure.

As shown in FIG. 9, the application scenarios of the desalination system of photovoltaic direct-driven membrane capacitive deionization may include a photovoltaic direct-driven group 110, a municipal power grid-connected group 120, a processor 130, a terminal 140, a network 150, and a memory 160. In some embodiments, the components in the application scenario of the desalination system of photovoltaic direct-driven membrane capacitive deionization may be connected and/or communicated with each other via the network 150 (e.g., wireless connection, wired connection, or a combination thereof). For example, the processor 130 may be connected to the memory 160 through the network 150.

In some embodiments, the desalination system of photovoltaic direct-driven membrane capacitive deionization may determine whether to adjust the preset process parameters of the membrane capacitive deionization water purification unit by implementing the methods and/or processes disclosed in this present disclosure. In some embodiments, the desalination system of photovoltaic direct-driven membrane capacitive deionization may also determine the adjusted process parameters of the membrane capacitive deionization water purification unit by implementing the methods and/or processes disclosed in this present disclosure. Specifically, the methods and/or process includes obtaining the salt content information of brackish water; obtaining preset process parameters based on salt content information; performing dehydration operation based on the preset process parameters; obtaining desalination performance; judging whether the desalination performance does not meet the preset condition, and in response to a judgement that the desalination performance does not meet the preset condition, adjusting at least part of the preset process parameters.

The photovoltaic direct-driven group 110 may refer to the system that utilizes the direct current generated by photovoltaics to directly drive the membrane capacitive deionization desalination water purification equipment and performs electro-adsorption desalination on brackish water to obtain high-quality fresh water. In some embodiments, the photovoltaic direct-driven group 110 may include a photovoltaic power collection unit, a power storage unit, a direct-driven power monitoring unit, a voltage adjustment unit, and a membrane capacitive deionization water purification unit. For the detailed descriptions of the photovoltaic power collection unit, the power storage unit, the direct-driven power monitoring unit, the voltage adjustment unit, and the membrane capacitive deionization water purification unit, please refer to the descriptions in other parts of the present disclosure of this present disclosure, for example, FIG. 1 and related descriptions.

The municipal power grid-connected group 120 may refer to the system that generates municipal power. In some embodiments, the municipal power grid-connected group 120 may include a grid-connected control unit, a grid busbar unit, and an intelligent detection unit. For details about the grid-connected control unit, the grid busbar unit and the intelligent detection unit, please refer to the descriptions in other parts of the present disclosure of this present disclosure, for example, FIG. 1 and related descriptions.

In some embodiments, the photovoltaic power collection unit, the power storage unit, and/or the grid-connected groups 120 in the photovoltaic direct-driven group 110 may supply the power for membrane capacitive deionization equipment for converting brackish water to high Quality fresh water. In some embodiments, when the photovoltaic power generated in the photovoltaic direct-driven group 110 is insufficient to provide the membrane capacitive deionization water purification unit, the municipal power grid-connected group 120 may be used to supply power to the membrane capacitive deionization equipment.

The processor 130 may process data and/or information related to the desalination system of photovoltaic direct-driven membrane capacitive deionization. In some embodiments, the processor 130 may connect the photovoltaic direct-driven group 110, the municipal power grid connected group 120, and/or the terminal 140 through the network 150 to access information and/or data. For example, the processor 130 may obtain preset process parameters, or the like from the photovoltaic direct-driven group 110. In some embodiments, the processor 130 may process the obtained information and/or data. For example, the processor 130 may process preset process parameters to determine the desalination performance. For another example, the processor 130 may process preset process parameters to determine the desalination performance, and may determine an adjustment scheme based on the desalination performance after adjusting the preset process parameters.

In some embodiments, the processor 130 may include one or more processing engines (e.g., a single-chip processing engine or a multi-chip processing engine). As an example, the processor 130 may include the central processing unit (CPU). The processor 130 may process data, information and/or processing results obtained from other devices or system components and execute program instructions based on the data, information, and/or processing results to perform one or more functions described in this present disclosure.

The terminal 140 may refer to one or more terminal devices or software used by a user. A user may refer to a person using a desalination system of photovoltaic direct-driven membrane capacitive deionization. For example, the user may be a worker of a factory or company performing desalination operations. In some embodiments, the terminal 140 may be a mobile device, a tablet computer, a laptop computer, etc., or any combination thereof. In some embodiments, the terminal 140 may interact with other components in the application scenario of the desalination system of photovoltaic direct-driven membrane capacitive deionization through the network 150.

The network 150 may include any suitable network that provides for the exchange of information and/or data for the various components in the application scenario of the desalination system of photovoltaic direct-driven membrane capacitive deionization. Information and/or data may be exchanged between one or more components (for example, the photovoltaic direct-driven group 110, the municipal power grid-connected group 120, the processor 130, the terminal 140, and the memory 160) in the application scenario of the photovoltaic direct-driven membrane capacitive deionization desalination system through the network 150. In some embodiments, the network 150 may be any one or more of wired network or wireless network. In some embodiments, the network 150 may include one or more network access scores. For example, the network 150 may include wired or wireless network access scores. In some embodiments, the network may be various topologies such as point-to-point, shared, centralized, etc., or a combination of multiple topologies.

The memory 160 may be used to store data, instructions and/or any other information. In some embodiments, the memory 160 may store data and/or information obtained from, for example, the photovoltaic direct-driven group 110, the municipal power grid-connected group 120, the processor 130, or the like. For example, the memory 160 may store prediction models, preset process parameters, or the like. In some embodiments, the memory 160 may be disposed in the processor 130. In some embodiments, the memory 160 may include mass storage, removable storage, or the like, or any combination thereof.

Figure 10:
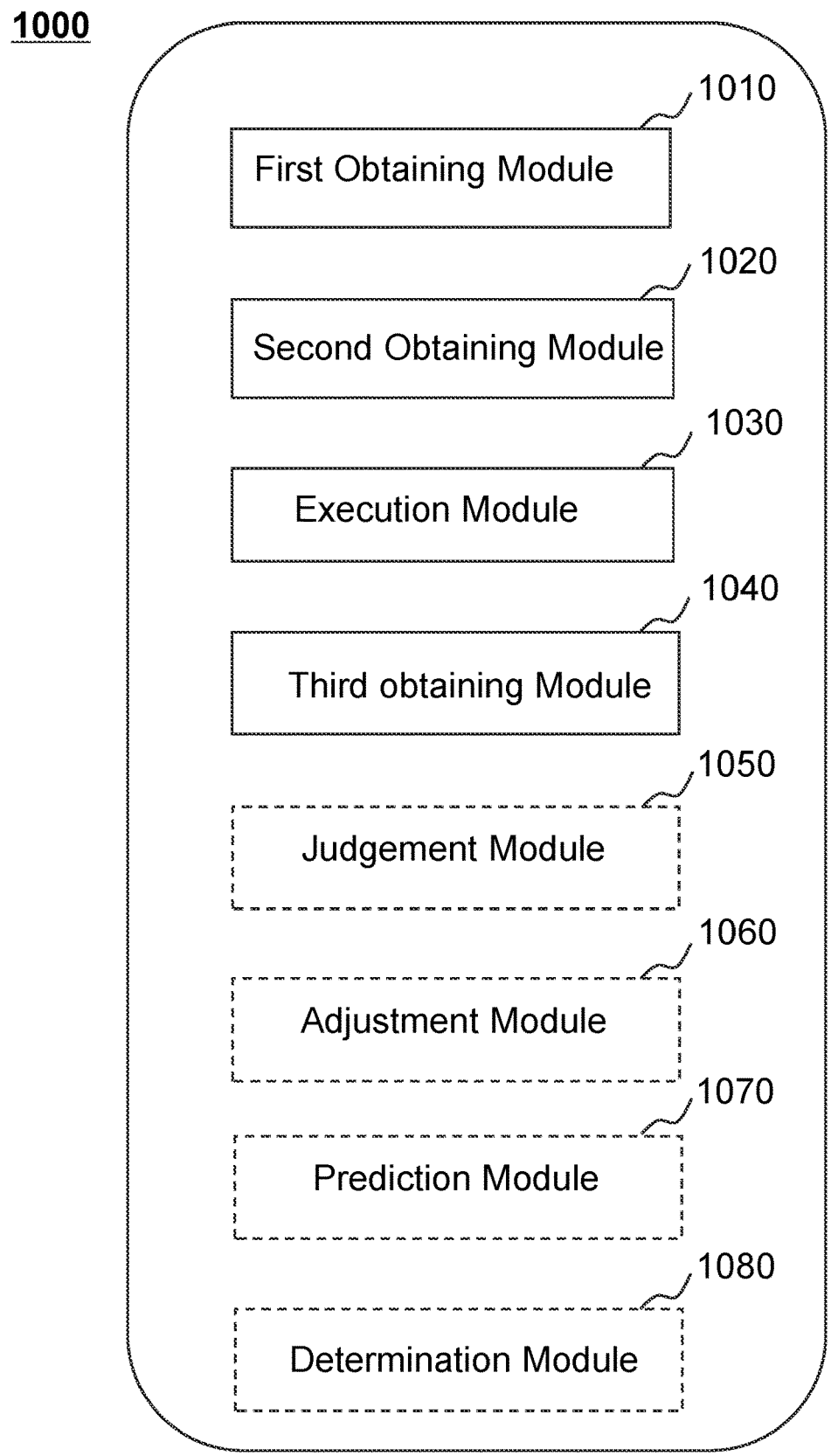
FIG. 10 is a schematic diagram illustrating the structure of a control unit in the desalination system of photovoltaic direct-driven membrane capacitive deionization according to some embodiments of the present disclosure.

FIG. 10 is a schematic diagram illustrating the structure of a control unit in the desalination system of photovoltaic direct-driven membrane capacitive deionization according to some embodiments of the present disclosure.

As shown in FIG. 10, the control unit may include a first obtaining module 1010, a second obtaining module 1020, an execution module 1030 and a third obtaining module 1040.

The first obtaining module 1010 may be used to obtain information about the salt content of the brackish water. For more information about the brackish water, the salt content, please refer to FIG. 11 and its related contents.

The second obtaining module 1020 may be configured to obtain preset process parameters based on the salt content information; The preset process parameters include at least one of feed flow rate, voltage, thickness of the separator, ion exchange membrane parameters, and salt water temperature. For more information about preset process parameters, please refer to FIG. 11 and its related contents.

The execution module 1030 may be used to control the membrane capacitive deionization water purification unit to perform desalination operation based on preset process parameters. For more information about the desalination operation, please refer to FIG. 11 and its related contents.

The third obtaining module 1040 may be used to obtain desalination performance; the desalination performance is determined based on at least one of desalination rate, adsorption rate, and current efficiency. For more information about desalination performance, desalination rate, adsorption rate, and current efficiency, please refer to FIG. 11 and its related contents.

As shown in FIG. 10, the control unit may further include a judgment module 1050 and an adjustment module 1060.

The judgement module 1050 may be used to judge whether the desalination performance meets the preset conditions. For more information about preset conditions, please refer to FIG. 11 and its related contents.

The adjustment module 1060 may be configured to adjust at least part of the preset process parameters based on the adjustment scheme; the adjustment scheme includes at least one of a temperature adjustment amount and a voltage adjustment amount. When adjusting the voltage in the preset process parameters, the steps include: the adjustment module sending the voltage adjustment amount to the voltage adjustment unit, and the voltage adjustment unit adjusting the voltage based on the voltage adjustment amount. based on the adjustment scheme, and adjusting at least some of the preset process parameters based on the adjustment scheme. For more information about the adjustment scheme, temperature adjustment amount, and voltage adjustment amount, please refer to FIG. 11 and its related contents.

As shown in FIG. 10, the control unit may further include a prediction module 1070 and a determination module 1080.

Based on the preset process parameters before adjustment, the adjusted preset process parameters corresponding to the candidate schemes, process parameter adjustment amounts, and the desalination performance before adjustment, the prediction module 1070 may be used to predict the adjusted desalination performance corresponding to the candidate scheme through the prediction model; and the prediction model is a machine learning model. For more information about the prediction model, the preset process parameters before adjustment, the candidate schemes, the adjusted preset process parameters and the process parameter adjustment amounts corresponding to the candidate schemes, the desalination performance before adjustment, and the desalination performance after adjustment, please refer to FIG. 12 and its related contents.

FIG. 11 is an exemplary flowchart of determining the adjustment scheme according to some embodiments of this present disclosure. In some embodiments, the desalination system of photovoltaic direct-driven membrane capacitive deionization further includes a control unit configured to perform operations including:

Step 1110, obtaining the salt content information of the brackish water.

The brackish water may refer to water containing at least one salt component. Salt components may include chlorides, sulfates, fluorides, or the like. In some embodiments, the brackish water may include sea water, lagoon water, or the like.

The salt content information may refer to information related to the content of at least one salt species in the brackish water. In some embodiments, the salt content information may include the name and content of salt components in the brackish water. The name of the salt component may be expressed by the salt ion it contains, for example, chloride ion, sulfate ion, etc. The content of salt components may be expressed by the mass concentration of salt substances or salt ions. For example, brackish water contains sodium chloride, and the content of which is 2000 mg/L. As another example, the brackish water contains chloride ions, the content of which is 1500 mg/L. The content of salt components may also be expressed as a percentage, for example, the salt content information may be: sodium chloride, 60%.

In some embodiments, the salt content information may be represented by a vector. For example, the salt content information is (a, b, c, d), where "a" may represent the mass fraction of chloride ions in the brackish water as a %, and "b" may represent the mass fraction of sodium ions in the brackish water as b %; "c" may represent that the mass fraction of magnesium ions in the brackish water as c %, and "d" may represent that the mass fraction of sulfate ions in the brackish water as d %. The ion information corresponding to each element in the vector may be preset. If the ion is not contained in the brackish water, the corresponding element value is 0. The salt content information may change with changes in the environment and the injection of external water sources.

In some embodiments, the salt content information may be obtained by measurement in various ways, for example, conductivity meter, atomic absorption spectrometry.

Step 1120, obtaining preset process parameters based on the salt content information, the preset process parameters including at least one of feed flow rate, voltage, thickness of the separator, ion exchange membrane parameters, and salt water temperature.

The preset process parameters may refer to preset process parameters related to the purification of brackish water. In some embodiments, the preset process parameters may be represented by a vector. For example, the preset process parameters may be (100, 1.6, 2, 1, 20), which means that the feed flow is 100 mL/min, the voltage is 1.6 V, and the thickness of the separator is 2 mm, the ion exchange membrane parameter is the cation exchange membrane numbered 1, and the brackish water temperature is 20° C.

In some embodiments, the process parameters such as feed flow rate, voltage, thickness of separator, ion exchange membrane parameter, brackish water temperature, etc. may affect the desalination performance of the membrane capacitive deionization water purification unit.

In some embodiments, the feed flow of the membrane capacitive deionization water purification unit may affect the desalination performance of the membrane capacitive deionization water purification unit. For example, when the feed flow rate is small, with the increase of the feed flow rate, the amount of solution passing through the membrane capacitive deionization water purification unit in the same time increases, the effective utilization area of the electrode increases, and the amount of electrode adsorption charge per unit time increases, the adsorption capacity and the desalination rate of the mass of the module increases, and the desalination performance of the membrane capacitive deionization water purification unit is also continuously improved. However, when the feed flow rate increases to a certain level and the feed flow rate far exceeds the load capacity of the electrode per unit time, a part of the ions will be taken out of the module by the solution without being adsorbed, and the desalination performance of the membrane capacitive deionization water purification unit will decrease.

In some embodiments, the voltage of the membrane capacitive deionization water purification unit may affect the desalination performance of the membrane capacitive deionization water purification unit. For example, as the voltage increases, the desalination performance of the membrane capacitive deionization water purification unit increases.

In some embodiments, the thickness of separator may affect the desalination performance of the membrane capacitive deionization water purification unit. For example, within a certain range, the thicker the thickness of the separator, the better the desalination performance of the membrane capacitive deionization water purification unit is. When the thickness of the separator exceeds a certain value, the desalination performance of the membrane capacitive deionization water purification unit will decrease with the increase of the thickness of the separator.

The addition of ion exchange membrane is beneficial to the desalination process to obtain faster ion migration rate and improve the desalination performance. In some embodiments, the ion exchange membrane parameters may affect the desalination performance of the membrane capacitive deionization water purification unit. The ion exchange membrane parameters may include types, membrane thickness, sheet resistance, migration number, water content, or the like. The types of the ion exchange membranes may include a cation exchange membrane and an anion exchange membrane. The cation exchange membrane may selectively allow cations in the solution to pass through and block anions under the action of an external direct current electric field; the anion exchange membrane may selectively allow anions in the solution to pass through and block cations under the action of an external direct current electric field. For example, the higher the migration number of the ion exchange membrane is, the higher the desalination performance of the membrane capacitive deionization water purification unit is.

In some embodiments, the brackish water temperature may affect the desalination performance of the membrane capacitive deionization water purification unit. For example, the higher the brackish water temperature is, the lower the desalination performance of the membrane capacitive deionization water purification unit is due to the influence of galvanic corrosion.

For more information about the desalination performance, please refer to the descriptions in the step 1140 and its related descriptions.

In some implementations, the preset process parameters may be determined through a preset process parameter determination model. The preset process parameter determination model may be a machine learning model. In some embodiments, the input of the preset process parameter determination model is the salt content information of the brackish water and the deionization desalination performance index to be achieved, and the output of the preset process parameter model may be the preset process parameters.

In some embodiments, the preset process parameter determination model may be obtained through training. For example, the training samples may be input into the initial process parameter determination model, a loss function may be constructed based on the outputs of the initial process parameter determination model, and the initial process parameters may be iteratively updated based on the loss function to determine the parameters of the model until the preset conditions are satisfied and the training is completed. After the training, the corresponding preset process parameter determination model may be obtained. The preset conditions may be that the loss function converges, the number of iterations reaches a threshold, or the like.

The training samples may be the salt content information of historical brackish water and the corresponding historical deionization desalination performance indicators that need to be achieved, and the label is process parameters. The training samples may be obtained based on historical data. The labels of the training samples may be obtained by manual annotation.

In some embodiments, the preset process parameters may also be manually set.

Step 1130, controlling the membrane capacitive deionization water purification unit to perform a desalination operation based on the preset process parameters.

The desalination operation may refer to the operation of desalinating brackish water by deionization of brackish water.

In some embodiments, the preset process parameters may be input into the control unit of the desalination system of photovoltaic direct-driven membrane capacitive deionization to perform the desalination operation. For example, the feed flow, voltage, thickness of the separator, ion-exchange membrane parameters, and brackish water temperature are input into the control unit of the desalination system of photovoltaic direct-driven membrane capacitive deionization, the membrane capacitive deionization water purification unit performs deionization desalination of brackish water according to the preset process parameters.

Step 1140, obtaining desalination performance determined based on at least one of desalination rate, adsorption rate, and current efficiency.

The desalination performance may refer to the performance of the membrane capacitive deionization water purification unit for the deionization desalination of brackish water. In some embodiments, the desalination performance may be expressed as scores. For example, the desalination performance may be 9 scores.

The desalination rate may refer to a percentage of the amount of salt ions filtered out from the brackish water to the initial salt ion content of the brackish water. In some embodiments, the desalination rate may be obtained by calculation. Exemplarily, the desalination rate may be calculated and determined by the following formula (1):

$$A = \frac{C_0 - C_1}{C_0}, \qquad (1)$$

where A is the desalination rate, and $C_0$ and $C_1$ represent the initial and final concentrations of ions in the brackish water, respectively.

For example, if the amount of chloride ions filtered out from the brackish water is 1000 mg/L, and the amount of the initial chloride ion amount in the brackish water is 2000 mg/L, then the desalination rate is 50%. The desalination rate may be used to characterize the desalination capability of the membrane capacitive deionization water purification unit. In some embodiments, the higher the desalination rate and the higher the desalination capacity is, the better the desalination performance is.

The absorption rate may refer to the amount of salt ions removed per unit time. In some embodiments, the adsorption rate may be obtained by calculation. Exemplarily, the adsorption rate may be calculated and determined by the following formula (2):

$$B = \frac{C_0 - C_1}{t}, \quad (2)$$

where B is the adsorption rate, $C_0$ and $C_1$ represent the initial concentration and final concentration of ions in the brackish water, respectively, and t represents the adsorption time.

For example, if 1000 mg of chloride ions are removed from the brackish water in one hour, then the adsorption rate is 1000 mg/h. The adsorption rate may be used to characterize the efficiency of desalination. In some embodiments, the higher the adsorption rate, the higher the desalination efficiency is, and the better the desalination performance is.

The current efficiency may refer to measure the proportion of electric energy used for effective desalination in the desalination system of photovoltaic direct-driven membrane capacitive deionization. In some embodiments, the current efficiency may be the ratio of the total charge of ions adsorbed or desorbed on the electrode to the total charge passing through the electrode. The current efficiency may be obtained by calculation. Exemplarily, the current efficiency may be calculated and determined by the following formula (3):

$$C = \frac{(C_0 - C_1)VF}{1000\, MIt}, \quad (3)$$

where C is the current efficiency, $C_0$ and $C_1$ are the initial and final concentrations of ions in the brackish water, respectively, V is the total volume of the brackish water scheme, F is the Faraday constant, M is the molar mass of the brackish water, I is the current through the membrane capacitive deionization water purification unit, and t is the adsorption time.

The current efficiency may be used to measure the utilization of energy. In some embodiments, the higher the current efficiency is, the higher the electrical energy used for an effective desalination process is, and the higher the utilization rate of electrical energy is, thereby reducing costs and improving the economics of desalination.

In some embodiments, the desalination performance is a weighted sum of desalination rate, adsorption rate, and current efficiency, the weight corresponding to the desalination rate is the largest.

In some embodiments, the desalination rate, the adsorption rate, and the current efficiency in the desalination performance may be represented by scores. For example, if the desalination rate is calculated to be within a range of 60%-70%, the corresponding score is 7 scores. Further, different weights may be assigned to the desalination rate, adsorption rate, and current efficiency, and then the weighted sum of the desalination rate, adsorption rate, and current efficiency may obtain a score representing the desalination performance. For example, if the desalination rate score is 8 scores, the weight is 0.6, the adsorption rate score is 6 scores, the weight is 0.2, the current efficiency score is 9 scores, the weight is 0.2, then the desalination performance score is 8*0.6+6*0.2+9*0.2=7.8.

Step 1150, judging whether the desalination performance meets preset conditions.

The preset conditions may refer to preset indicators related to the desalination performance. In some embodiments, the preset conditions may be set for the desalination performance. In some embodiments, the preset conditions may be set for the desalination rate, adsorption rate, and current efficiency, respectively.

In some embodiments, the preset conditions may be the minimum score that the corresponding indicator needs to meet. When the actual desalination performance exceeds the preset conditions, it may be judged that the desalination performance meets the preset conditions. For example, the preset conditions are 8 scores, and when the actual desalination performance is 9 scores, it may be determined that the desalination performance meets the preset conditions. In some embodiments, when the actual desalination rate, adsorption rate, and current efficiency all meet their corresponding preset conditions, it may be determined that the desalination performance meets the preset conditions.

Step 1160, in response to the desalination performance not meeting the preset conditions, adjusting at least part of the preset process parameters based on the adjustment scheme; the adjustment scheme including at least one of a temperature adjustment amount and a voltage adjustment amount. When adjusting the voltage in the preset process parameters, it includes: the control unit sending the voltage adjustment amount to the voltage adjustment unit, and the voltage adjustment unit adjusting the voltage based on the voltage adjustment amount.

The adjustment scheme may refer to a scheme in which the corresponding desalination performance obtained by adjusting the preset process parameters may meet the preset conditions.

The temperature adjustment amount may refer to an amount for adjusting the temperature of the brackish water in the preset process parameters. For example, if the brackish water temperature in the preset process parameters is 10° C., and the brackish water temperature in the adjustment scheme is 12° C., the temperature adjustment amount may be 2° C. Similarly, the voltage adjustment amount may refer to an amount for adjusting the voltage in the preset process parameters.

In some embodiments, the photovoltaic direct-driven membrane capacitive deionization system further includes a heat exchange system for adjusting the temperature of the brackish water, after the control unit receives the temperature adjustment amount, it may send the temperature adjustment amount to the heat exchange system, and adjust the temperature by adjusting the flow rate of the heat source.

In some embodiments, the control unit may send the voltage adjustment amount to the voltage adjustment unit by communicating with the voltage adjustment unit, and the voltage adjustment unit adjusts the voltage based on the voltage adjustment amount. For example, if the voltage adjustment amount is increased by 100 V, the voltage adjustment unit will increase the voltage value of the membrane capacitive deionization water purification unit by 100 V after receiving it.

The desalination system of photovoltaic direct-driven membrane capacitive deionization provided by some embodiments of this present disclosure may determine whether to adjust the preset process parameters and the corresponding adjustment scheme based on the current actual desalination performance, and may reasonably plan the production in real time according to the actual situation.

Figure 12:
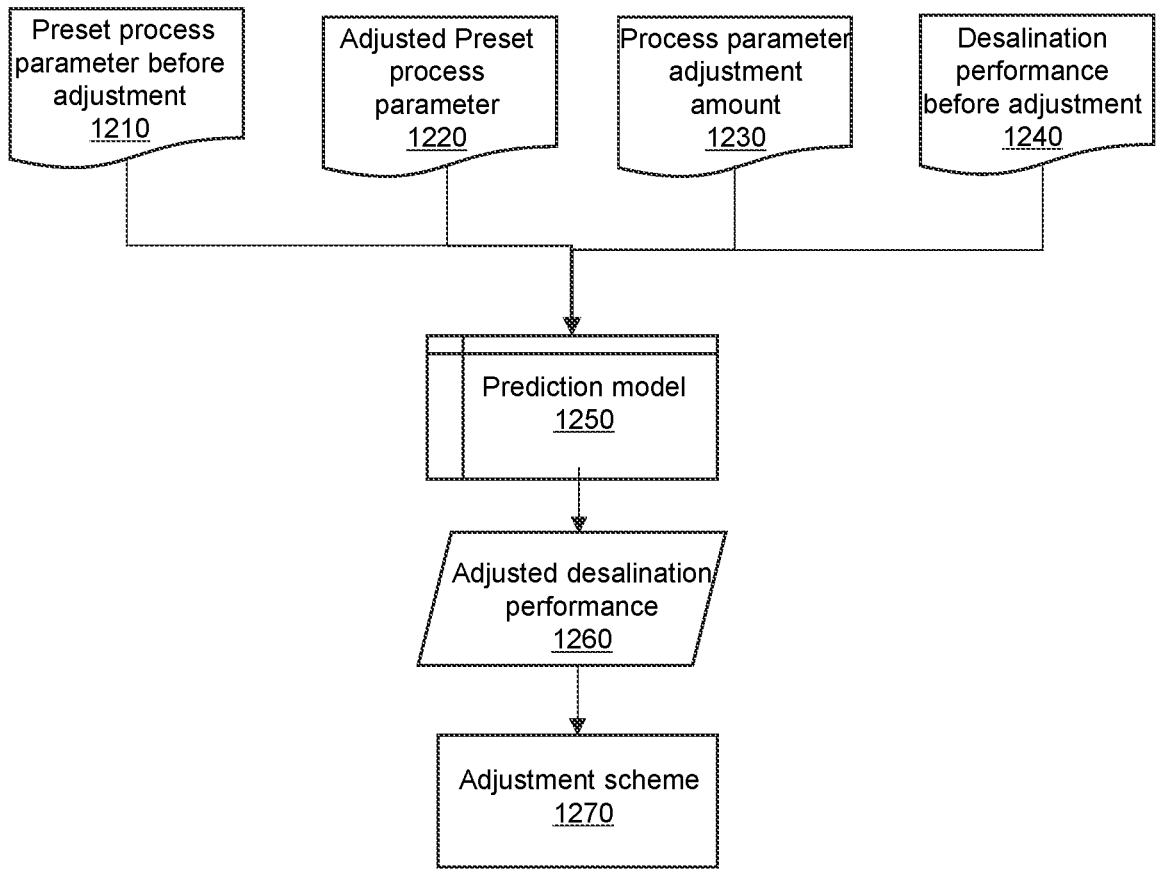
FIG. 12 is a schematic diagram of determining an adjustment scheme according to some embodiments of the present disclosure.

FIG. 12 is a schematic diagram of determining an adjustment scheme according to some embodiments of the present disclosure.

In some embodiments, through the prediction model 1250, based on the pre-adjusted preset process parameter 1210, the adjusted preset process parameter 1220 corresponding to the candidate scheme, the process parameter adjustment amount 1230, and the desalination performance 1240 before adjustment, the adjusted desalination performance 1260 corresponding to the candidate scheme is predicted, and the prediction model is a machine learning model.

In some embodiments, the adjusted desalination performance 1260 corresponding to the candidate schemes may be predicted by the prediction model 1250. The input of the prediction model 1250 may include the pre-adjusted preset process parameter 1210, the adjusted preset process parameter 1220 corresponding to the candidate scheme, the process parameter adjustment amount 1230, and the desalination performance 1240 before adjustment. The output of the prediction model may include the adjusted desalination performance 1260 for the candidate scheme.

The pre-adjusted preset process parameter 1210 may refer to the current process parameter. In some embodiments, the pre-adjusted preset process parameter 1210 may be the preset process parameter.

The adjusted preset process parameters 1220 corresponding to the candidate scheme may be the preset process parameter in the candidate scheme.

The candidate scheme may refer to a scheme obtained by adjusting at least one of the preset process parameters. In some embodiments, at least one of the preset process parameters may be adjusted to obtain at least one candidate. For example, the preset process parameters are (100, 1.6, 2, 1, 20), the candidate scheme may be (100, 1.6, 2, 1, 25), and the brackish water temperature is adjusted by 5° C. in the candidate scheme.

The process parameter adjustment amount may refer to the difference between the process parameters in the candidate scheme and the corresponding process parameters in the preset process parameters. For example, the brackish water temperature in the preset process parameters is 70° C., and the brackish water temperature in the candidate scheme is 75° C., then the process parameter adjustment amount is +5° C. In some embodiments, the process parameter adjustment amount includes at least one of a temperature adjustment amount and a voltage adjustment amount.

In some embodiments, at least one preset process parameter may be adjusted based on the effect of at least one process parameter on the desalination performance to obtain a candidate scheme. For example, when the desalination performance is too low, the brackish water temperature in the preset process parameters may be reduced by 3° C. as a candidate. In some embodiments, a fixed parameter adjustment amount may be set for the preset process parameters to determine the candidate scheme. For example, every 1° C. increase or decrease in the temperature of brackish water in the preset process parameters may be used as a candidate scheme, and for another example, every 10 V increase or decrease in the voltage in the preset process parameters may be used as a candidate scheme.

The desalination performance 1240 before adjustment may refer to the current actual desalination performance determined by performing deionization desalination according to the preset process parameter 1210 before adjustment. In some embodiments, the desalination performance 1240 before adjustment may include the current actual desalination rate, adsorption rate, and current efficiency.

The adjusted desalination performance 1260 corresponding to the candidate scheme may refer to the predicted desalination performance corresponding to the candidate scheme based on the prediction model 1250. In some embodiments, the adjusted desalination performance 1260 corresponding to the candidate scheme may include at least one of desalination rate, adsorption rate, and current efficiency.

In some embodiments, the prediction model 1250 may be obtained by training. For example, the training samples may be input into the initial prediction model, a loss function may be constructed from the outputs of the initial prediction model, and parameters of the initial prediction model may be iteratively updated based on the loss function until the preset conditions are satisfied and the training is completed.

In some embodiments, the training samples may include preset process parameters before historical adjustment, adjusted historical preset process parameters corresponding to historical candidate schemes, adjustment amounts of historical process parameters, and historical desalination performance before adjustment, the training samples may be obtained based on historical data, and the labels are the adjusted historical desalination performance corresponding to the historical candidate schemes.

The prediction models provided by some embodiments of this present disclosure, take into account the effect of the preset process parameters before adjustment, the adjusted preset process parameters corresponding to the candidate schemes, the adjustment amount of process parameters, and the desalination performance before adjustment on the desalination performance, which may predict the desalination performance of the candidate schemes more accurately.

In some embodiments, the adjustment scheme 1270 may be determined from the candidate schemes based on the adjusted desalination performance 1260 corresponding to each of the candidate schemes.

In some embodiments, the adjustment scheme 1270 may be the one with the least power consumption among the candidate schemes that meet the first preset requirement.

The first preset requirement may refer to the lowest comparison standard set for the desalination performance corresponding to the candidate scheme. In some embodiments, the first preset requirement may include: setting a first preset value, a second preset value, and a third preset value for the desalination rate, the adsorption rate, and the current efficiency, respectively. In some embodiments, meeting the first preset requirement includes that: the corresponding adjusted desalination performance is not lower than the first preset value, the adsorption rate is not lower than the second preset value, and the current efficiency is not lower than the third preset value.

In some embodiments, after obtaining the desalination rate, adsorption rate, and current efficiency corresponding to the candidate scheme based on the prediction model 1250, by comparing the desalination rate, adsorption rate, and current efficiency corresponding to the candidate schemes with the first preset value, the second preset value, and the third preset value, a preferred candidate scheme that meets the first preset requirement is determined from the candidate schemes. The preferred candidate scheme may refer to a scheme that meets the first preset requirement among the candidate schemes. For example, the preset condition may be that the desalination rate is 70%, the adsorption rate may be 50 g/s, and the current efficiency is 60%; based on the prediction model, the desalination rate corresponding to the candidate scheme A is 71%, the adsorption rate may be 60 g/s, and the current efficiency may be 70%; based on the prediction model, the desalination rate corresponding to the candidate scheme B is 60%, the adsorption rate may be 40 g/s, and the current efficiency is 60%, so the candidate scheme A is determined as the preferred candidate scheme.

In some embodiments, the number of preferred candidate schemes may be less than or equal to the number of candidate schemes. An adjustment scheme may be determined from the preferred candidates for the desalination operation. In some embodiments, the scheme with the least power consumption may be determined as the adjustment scheme from the preferred candidate schemes. For example, if the power consumption of the preferred candidate scheme A is lower than that of the preferred candidate scheme B, then the preferred candidate scheme A may be determined as the adjustment scheme.

By setting preset thresholds for the desalination rate, the adsorption rate, and the current efficiency in desalination performance, respectively, an adjustment scheme based on the desalination rate, the adsorption rate, and the current efficiency may be obtained to meet the production requirements for the desalination performance in terms of the desalination rate, the adsorption rate, and the current efficiency.

In some embodiments, the scheme with the highest desalination rate in the desalination performance obtained based on the prediction model 1250 may be selected as the adjustment scheme 1270 from the preferred candidate schemes. For example, based on the prediction model, the desalination rate corresponding to the candidate scheme C may be 80%, the adsorption rate may be 60 g/s, and the current efficiency may be 70%; based on the prediction model, the desalination rate corresponding to the candidate scheme D is 90%, the adsorption rate may be 40 g/s, and the current efficiency is 60%, so the candidate scheme D is determined as the preferred candidate scheme.

In some embodiments, when the desalination rates corresponding to two of the at least two preferred candidate schemes are equal or similar (for example, the difference is less than a preset threshold), the preferred candidate with the highest adsorption rate and/or the current efficiency may be identified as the adjustment scheme 1270. For example, the preset threshold is 5° C., based on the prediction model, the desalination rate corresponding to the candidate scheme E is 80%, the adsorption rate may be 60 g/s, and the current efficiency may be 70%; based on the prediction model, the desalination rate corresponding to the candidate scheme F is 81%, the adsorption rate may be 40 g/s, and the current efficiency is 60%, so the candidate scheme E is determined as the preferred candidate scheme.

In some embodiments, when the desalination rate, the adsorption rate and/or the current efficiency corresponding to two of the at least two preferred candidate schemes are all equal or similar (for example, the difference is less than a preset threshold), a preferred candidate scheme with less loss caused by the adjustment amount of temperature and voltage may be determined as the adjustment scheme 1270. For example, the preferred candidate scheme A is to increase the temperature of brackish water by 2° C., and the preferred candidate scheme B is to increase the temperature of brackish water by 4° C., when the desalination rate, adsorption rate, and/or current efficiency of the adjustment scheme A are similar, since the preferred candidate scheme A is more energy efficient, the preferred candidate scheme A is preferably selected as the adjustment scheme.

By increasing the weight of the desalination rate in the desalination performance as the evaluation index of the merits of the adjustment scheme, products that preferentially meet the desalination rate requirements may be obtained.

The prediction models provided in some embodiments of this present disclosure predict the desalination performance of the candidate schemes, and adjust the preset process parameters based on the prediction results, so that the adjustment schemes may be obtained more accurately, which improve the accuracy of the adjustment scheme and also avoid the cost and time waste caused by multiple candidate schemes.

Figure 13:
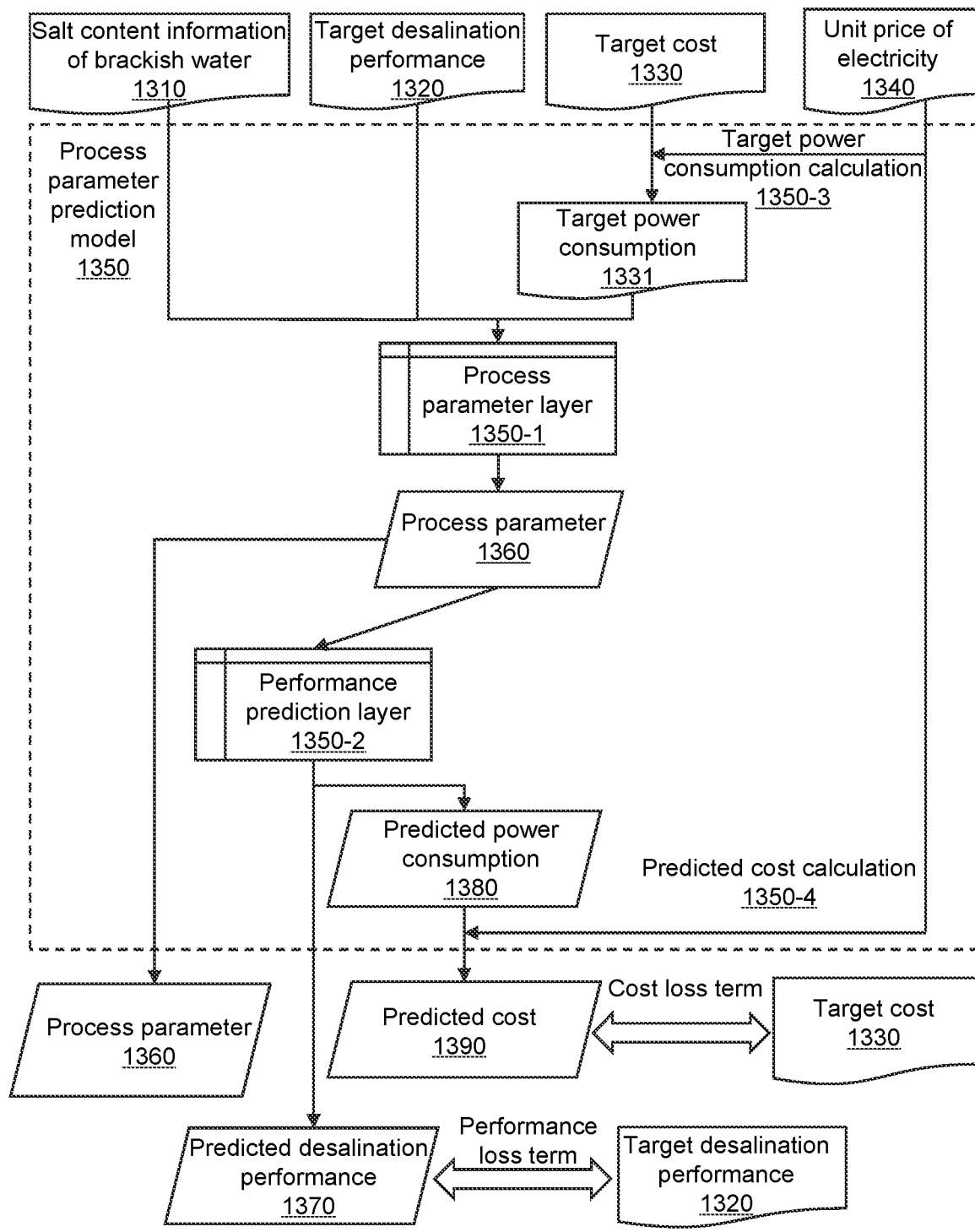
FIG. 13 is a schematic diagram illustrating a method of determining process parameters according to some embodiments of the present disclosure.

FIG. 13 is a schematic diagram illustrating a method of determining process parameters according to some embodiments of the present disclosure.

In some embodiments, the process parameter 1360 may be determined by the process parameter prediction model 1350 based on the brackish water salt content information 1310, the target desalination performance 1320, the target cost 1330, and the unit price of electricity 1340. The process parameter prediction model is a machine learning model.

The target desalination performance may refer to the expected desalination performance that is expected to be achieved in the process of brackish water purification. The target desalination performance 1320 may include a target desalination rate, a target adsorption rate, and a target current efficiency. The target desalination performance may be preset based on needs. For example, the target desalination performance may be set as: the target desalination rate being 80%, the target adsorption rate being 60 g/s, and the target current efficiency being 70%.

The target cost may refer to the cost of the brackish water purification process that is expected to control. The cost may refer to the cost of power consumption (e.g., electrical power consumption) required in the brackish water purification process. The cost may be the total amount of electricity consumed in the brackish water purification process. For example, the target cost may be the product of electrical power consumption and unit price of electricity. The target cost may be preset based on need.

The unit price of electricity may refer to the price per unit of electricity consumption. For example, the unit price of electricity may be the price per kilowatt-hour of electricity at that time.

In some embodiments, the process parameter prediction model 1350 may be a machine learning model, and may include a process parameter layer 1350-1, a performance prediction layer 1350-2, a target power consumption calculation 1350-3, and a predicted cost calculation 1350-4.

The target power consumption calculation 1350-3 calculates the target power consumption 1331 based on the target cost 1330 and the unit price of electricity 1340, and the calculation may be performed based on a formula.

The predicted cost calculation 1350-4 calculates the predicted cost 1390 based on the predicted power consumption 1380 and the unit price of electricity 1340, which may be performed based on a formula.

The process parameter layer may be used to determine process parameters. The inputs to the process parameters layer 1350-1 may include the salt content information of the brackish water 1310, the target desalination performance 1320, and the target power consumption 1331. The output of the process parameter layer 1350-1 may include the process parameter 1360. For more information about descriptions of the process parameter, please refer to FIG. 11 and its related contents.

The performance prediction layer may be used to predict desalination performance and power consumption based on process parameters. The input of the performance prediction layer 1350-2 may include the process parameter 1360. The output of the performance prediction layer 1350-2 may include the predicted desalination performance 1370 and the predicted power consumption 1380. For more descriptions of desalination performance, please refer to FIG. 11 and its related contents.

In some embodiments, when the process parameters are predicted based on the process parameter prediction model, the salt content information of the brackish water 1310, the target desalination performance 1320, the target cost 1330, and the unit price of electricity 1340 may be input into the process parameter prediction model. The target power consumption 1331 is determined by the target power consumption calculation 1350-3 based on the target cost 1330 and the unit price of electricity 1340 within the model. Within the model, the salt content information of the brackish water 1310, the target desalination performance 1320, and the target power consumption 1331 are input into the process parameter layer 1350-1. The process parameter 1360 output by the process parameter layer 1350-1 is used as the output of the process parameter prediction model 1350, and the predicted desalination performance 1370, the predicted power consumption 1380, and the predicted cost 1390 may also be used as the output of the process parameter prediction model 1350. The predicted cost 1390 may be determined through the predicted cost calculation 1350-4 based on the predicted power consumption 1380 and the unit price of electricity 1340.

The process parameter layer and the performance prediction layer may be neural networks or other machine learning model structures respectively, and the implementation methods and structures of the two may be different.

The process parameter prediction model may be obtained by training.

The performance prediction layer in the process parameter prediction model may be obtained by pre-training based on the training samples, and optimized during joint training with the process parameter layer. The training samples of the performance prediction layer during pre-training may include historical preset process parameters, the training samples may be obtained based on historical data, and the labels are the historical desalination performance and historical power consumption corresponding to the historical preset process parameters.

The process parameter layer in the process parameter prediction model may be jointly trained with the pre-trained performance prediction layer.

The input of the process parameter layer during training may come from the salt content information, actual desalination performance, and actual power consumption of the brackish water in the actual historical data, and the labels of the process parameters are the corresponding actual process parameters in the historical data. In this way, the model may be trained to solve the process parameters corresponding to the target conditions based on the objective laws existing between several types of data, thereby reducing the complex calculation amount and uncertainty of trial calculation through multiple sets of preset parameters.

The loss function during training includes a loss term related to the predicted process parameters, a performance loss term based on the performance compliance rate, and a cost loss term based on the power consumption cost index. The joint training may be performed with various feasible methods such as gradient descent.

The performance compliance rate may refer to the degree of compliance of the predicted desalination performance with the target desalination performance. For example, the performance compliance rate may be determined based on the difference between the predicted desalination performance and the target desalination performance. The difference may be the weighted sum of the differences between the predicted desalination rate and the target desalination rate, the difference between the predicted adsorption rate and the target adsorption rate, and the difference between the predicted current efficiency and the target current efficiency. Exemplarily, the performance compliance rate may be obtained based on the following formula:

$$y=a^{x-b},$$

In this formula, x is the difference between the target desalination performance and the predicted desalination performance, and y is the performance compliance rate. The formula contains parameter a and parameter b. The parameter a is a real number greater than 1. For example, a may take the natural logarithm e. The parameter b is a real number greater than 0. For example, b may take 1. The parameters a and b may be preset based on experience.

The power consumption cost index may refer to the degree to which the predicted cost is in line with the target cost. For example, the power consumption index may be determined based on the difference between the predicted cost and the target cost. Exemplarily, the power consumption cost index may be obtained based on the following formula:

$$y=c^{x-d},$$

In this formula, x is the difference between the predicted cost and the target cost, and y is the power consumption cost index. This formula contains parameter c and parameter d. The parameter c is a real number greater than 1. For example, c may take the natural logarithm e. The parameter b is a real number greater than 0. For example, b may take 1. Parameters c and d may be preset based on experience.

Through the above model, the process parameters that meet the requirements may be predicted based on the experience learned from historical data. The model may simultaneously predict the actual desalination performance, etc. based on the obtained process parameters. Due to the combination of loss functions, the model may better make the actual performance close to or better than the target performance and the actual cost close to or lower the target cost.

In some embodiments, the performance loss term corresponding to the performance compliance rate and the cost loss term corresponding to the power consumption cost may respectively have weight coefficients. The weight coefficients may be preset based on experience. Through the weight coefficient, the policy objectives of the model may be adjusted to better meet different requirements in multi-objective tasks.

The process parameter prediction model provided by some embodiments of this present disclosure predicts process parameters, and inputs the predicted process parameters into the performance prediction layer to obtain the predicted desalination performance and the predicted power consumption, which may obtain more ideal process parameters and improve the accuracy of process parameter prediction model.

The basic concepts have been described above. Obviously, for those skilled in the art, the above detailed disclosure is merely an example, and does not constitute a limitation of the present disclosure. Although not explicitly described herein, various modifications, improvements, and corrections to this present disclosure may occur to those skilled in the art. Such modifications, improvements, and corrections are suggested in this present disclosure, so such modifications, improvements, and corrections still belong to the spirit and scope of the exemplary embodiments of this present disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this present disclosure are not necessarily all referring to the same embodiment. Furthermore, the particular features, structures, or characteristics may be combined as suitable in one or more embodiments of the present disclosure.

Furthermore, unless explicitly stated in the claims, the order of processing elements and sequences described in this present disclosure, the use of numbers and letters, or the use of other names are not intended to limit the order of the processes and methods of this present disclosure. While the foregoing disclosure discusses by way of various examples some embodiments of the invention presently believed to be useful, it is to be understood that such details are provided for purposes of illustration only and that the appended claims are not limited to the disclosed embodiments, on the contrary, the claims are intended to cover all modifications and equivalent combinations that come within the spirit and scope of the embodiments of this present disclosure. For example, although the implementation of various components described above may be embodied in a hardware device, it may also be implemented as a software only scheme, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, present disclosures, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A desalination system of photovoltaic direct-driven membrane capacitive deionization, comprising a photovoltaic direct-driven group and a municipal power grid-connected group, wherein the photovoltaic direct-driven group includes a photovoltaic power collection unit, a power storage unit, a direct-driven power monitoring unit, a voltage adjustment unit, and a membrane capacitive deionization water purification unit;

the municipal power grid-connected group includes a grid-connected control unit, a grid busbar unit, and an intelligent detection unit;

the photovoltaic power collection unit supplies power to the membrane capacitive deionization water purification unit and the power storage unit at the same time or separately; the voltage adjustment unit is located between the photovoltaic power collection unit and the membrane capacitive deionization water purification unit; the voltage adjustment unit includes a voltage booster and a voltage regulator, the voltage booster is used to adjust a supplied voltage of the photovoltaic direct-driven group to a required voltage of the membrane capacitive deionization water purification unit, and the voltage regulator is used to control an upstream voltage of the membrane capacitive deionization water purification unit;

the power storage unit is connected in parallel with the voltage adjustment unit and located between the photovoltaic power collection unit and the membrane capacitive deionization water purification unit;

the direct-driven power monitoring unit is respectively connected to the power storage unit and the membrane capacitive deionization water purification unit; the direct-driven power monitoring unit includes a computer, a sensor, and a plurality of switch groups; the sensor is respectively installed on the power storage unit and the voltage adjustment unit, which is used to monitor an electricity consumption state of the membrane capacitive deionization water purification unit and an electricity storage state of the power storage unit; the plurality of switch groups are respectively located and create channels between the photovoltaic power collection unit and the power storage unit, between the power storage unit and the membrane capacitive deionization water purification unit, and between the photovoltaic power collection unit and the voltage adjustment unit, which are used to control connection and disconnection of each channel; and the computer is used to collect data obtained by the sensor and formulate a connection and disconnection strategy for each switch group in the plurality of switch groups to switch a working mode of the photovoltaic direct-driven group;

the plurality of switch group includes a first switch group, a second switch group, and a third switch group; the first switch group is located between the photovoltaic power collection unit and the voltage adjustment unit, the second switch group is located between the photovoltaic power collection unit and the power storage unit, and the third switch group is located between the power storage unit and the membrane capacitive deionization water purification unit; and the first switch group, the second switch group, and the third switch group are all normally closed switches;

the grid-connected control unit is located between the photovoltaic power collection unit and the grid busbar unit; the grid-connected control unit includes a grid-connected group cabinet, and the grid-connected group cabinet includes an alternating current/direct current (AC/DC) converter, an inverter, and a switch group of the grid-connected group cabinet;

the AC/DC converter is located between the grid busbar unit and the voltage adjustment unit in the photovoltaic direct-driven group; the inverter is located between the grid busbar unit and the photovoltaic power collection unit in the photovoltaic direct-driven group, the switch group of the grid-connected group cabinet includes a fourth switch group and a fifth switch group, and the fourth switch group and the fifth switch group are all normally closed switches; and the intelligent detection unit is located between the grid busbar unit and the grid-connected control unit, which is connected to the voltage adjustment unit in the photovoltaic direct-driven group; and the intelligent detection unit performs automatic allocation of electric energy between the municipal power grid-connected group and the photovoltaic direct-driven group.

2. The desalination system of claim 1, wherein the voltage adjustment unit boosts and stabilizes photovoltaic direct current to meet needs of membrane capacitive deionization direct current power supply;

the power storage unit obtains surplus electric energy from the photovoltaic power collection unit and stores it, and supplies direct current to the membrane capacitive deionization water purification unit; and the direct-driven power monitoring unit simultaneously monitors electricity consumption of the power storage unit and the membrane capacitive deionization water purification unit, and flexibly allocates between the membrane capacitive deionization water purification unit and the power storage unit.

3. The desalination system of claim 1, wherein when the power storage unit is fully loaded and power supply of the membrane capacitive deionization water purification unit meets a condition, the grid-connected control unit inverts excess electric energy generated by the photovoltaic direct-driven group to the grid busbar unit, and when the photovoltaic direct-driven group do not meet the power supply of the membrane capacitive deionization water purification unit, the grid-connected control unit obtains power from the grid busbar unit to achieve peak shaving compensation; and the intelligent detection unit simultaneously monitors operation status of the municipal power grid-connected group and the photovoltaic direct-driven group, and automatically allocates the power supply in the photovoltaic direct-driven group and the municipal power grid-connected group.

4. The desalination system of claim 3, wherein the AC/DC converter is used to convert grid alternating current into the direct current required by the membrane capacitive deionization water purification unit;

the inverter is used to convert the direct current generated by the photovoltaic collection unit into the alternating current and invert the alternating current to the grid busbar unit; and the switch group of the grid-connected group cabinet is used to physically switch a direction of power transmission between the grid busbar unit and the photovoltaic direct-driven group.

5. The desalination system of claim 4, wherein the fourth switch group is located between the inverter and the grid busbar unit, which is used to control opening and closing of a passage from the photovoltaic direct-driven group to the grid busbar unit, and the fifth switch group is located between the converter and the grid busbar unit, which is used to control opening and closing of a passage of the grid busbar unit to the photovoltaic direct-driven group.

* * * * *